US010024532B2

(12) United States Patent
Kimura et al.

(10) Patent No.: US 10,024,532 B2
(45) Date of Patent: Jul. 17, 2018

(54) COMBUSTION CONTROL DEVICE, COMBUSTION SYSTEM, COMBUSTION CONTROL METHOD AND PROGRAM

(71) Applicant: MITSUBISHI HEAVY INDUSTRIES, LTD., Tokyo (JP)

(72) Inventors: Yuichiro Kimura, Tokyo (JP); Toshihiko Saito, Tokyo (JP); Shinji Akamatsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/906,662

(22) PCT Filed: Dec. 27, 2013

(86) PCT No.: PCT/JP2013/085104
§ 371 (c)(1),
(2) Date: Jan. 21, 2016

(87) PCT Pub. No.: WO2015/097861
PCT Pub. Date: Jul. 2, 2015

(65) Prior Publication Data
US 2016/0153656 A1 Jun. 2, 2016

(51) Int. Cl.
*F23D 14/82* (2006.01)
*F23R 3/34* (2006.01)
(Continued)

(52) U.S. Cl.
CPC ............... *F23D 14/82* (2013.01); *F02C 9/34* (2013.01); *F23N 1/002* (2013.01); *F23N 5/242* (2013.01);
(Continued)

(58) Field of Classification Search
CPC .... F23D 14/82; F23D 14/825; F23N 2031/28; F23N 5/242; F02C 9/34; F02C 9/28;
(Continued)

(56) References Cited

U.S. PATENT DOCUMENTS 5,961,314 A * 10/1999 Myhre .................. F01D 21/003
250/206
6,338,240 B1 * 1/2002 Endo ......................... F02C 9/34
60/39.27
(Continued)

FOREIGN PATENT DOCUMENTS

JP          8-68537        3/1996
JP       2002-70584        3/2002
(Continued)

OTHER PUBLICATIONS

PLC Basics 2007 http://www.plcdev.com/book/export/html/9.*
(Continued)

*Primary Examiner* — William H Rodriguez
*Assistant Examiner* — William Breazeal
(74) *Attorney, Agent, or Firm* — Wenderoth, Lind & Ponack, L.L.P.

(57) ABSTRACT

A combustion system includes a combustor having staging blocks and flashback detection units configured to detect flashbacks occurring in the staging blocks, and a combustion control device configured to stop a supply of a fuel for one of the staging blocks in which a flashback occurs based on a detection signal from one of the flashback detection units. The combustion control device includes a staging processing unit configured to instruct to supply the fuel or stop the supply of the fuel for each of the staging blocks based on a staging pattern in which an operating line is specified and a load adjustment unit configured to reduce an amount of load to a level at which the supply of the fuel for the one of the
(Continued)

staging blocks is stopped when the detection signal is input from the one of the flashback detection units.

11 Claims, 20 Drawing Sheets

(51) Int. Cl.
  *F02C 9/34* (2006.01)
  *F23N 5/24* (2006.01)
  *F23R 3/46* (2006.01)
  *F23R 3/28* (2006.01)
  *F23R 3/36* (2006.01)
  *F23N 1/00* (2006.01)

(52) U.S. Cl.
  CPC ............ *F23R 3/286* (2013.01); *F23R 3/346* (2013.01); *F23R 3/36* (2013.01); *F23R 3/46* (2013.01); *F23N 2031/28* (2013.01)

(58) Field of Classification Search
  CPC .... F02C 9/46; F23R 3/286; F23R 3/36; F23R 3/346; G01C 3/08; G01S 17/02
  See application file for complete search history.

(56) References Cited

U.S. PATENT DOCUMENTS

| | | | |
|---|---|---|---|
| 7,721,553 B2 | 5/2010 | Miller et al. | |
| 2007/0006596 A1* | 1/2007 | Fujii | F23N 5/242 60/779 |
| 2010/0175384 A1 | 7/2010 | Kraemer et al. | |
| 2010/0180564 A1* | 7/2010 | Ziminsky | F02C 9/28 60/39.1 |
| 2010/0275573 A1 | 11/2010 | Frederick | |
| 2010/0280732 A1 | 11/2010 | Singh et al. | |
| 2012/0017600 A1* | 1/2012 | Saito | F02C 9/263 60/773 |
| 2014/0196461 A1* | 7/2014 | Soni | F23N 5/16 60/772 |

FOREIGN PATENT DOCUMENTS

| | | |
|---|---|---|
| JP | 2004-143942 | 5/2004 |
| JP | 2006-145073 | 6/2006 |
| JP | 2007-16708 | 1/2007 |
| JP | 2009-115081 | 5/2009 |
| JP | 2010-91259 | 4/2010 |
| JP | 2010-164296 | 7/2010 |
| JP | 2010-169084 | 8/2010 |
| JP | 2010-261434 | 11/2010 |
| JP | 2010-261445 | 11/2010 |
| JP | 2010-285988 | 12/2010 |
| JP | 2011-185265 | 9/2011 |
| JP | 2013-2451 | 1/2013 |

OTHER PUBLICATIONS

International Search Report dated Feb. 25, 2014 in corresponding International Application No. PCT/JP2013/085104 (with English translation).

Written Opinion of the International Searching Authority dated Feb. 25, 2014 in corresponding International Application No. PCT/JP2013/085104 (with English translation).

\* cited by examiner

FIG. 4

<STAGING PATTERN SP>

| TURBINE LOAD L | A-LINE | B-LINE |
|---|---|---|
| 0 | SUPPLY AMOUNT 0 (STOP) | SUPPLY AMOUNT 0 (STOP) |
| ⋮ | ⋮ | ⋮ |
| L1 | SUPPLY AMOUNT Pa1 | SUPPLY AMOUNT 0 (STOP) |
| ⋮ | ⋮ | ⋮ |
| L2 | SUPPLY AMOUNT 0 (STOP) | SUPPLY AMOUNT Pb2 |
| ⋮ | ⋮ | ⋮ |
| L3 | SUPPLY AMOUNT Pa3 | SUPPLY AMOUNT Pb3 |

<STAGING PATTERN SP1>

| TURBINE LOAD L | A-LINE | B-LINE |
|---|---|---|
| 0 | SUPPLY AMOUNT 0 (STOP) | SUPPLY AMOUNT 0 (STOP) |
| ⋮ | ⋮ | ⋮ |
| L1' | SUPPLY AMOUNT Pa1' | SUPPLY AMOUNT 0 (STOP) |
| ⋮ | ⋮ | ⋮ |
| L2' | SUPPLY AMOUNT Pa2' | SUPPLY AMOUNT Pb2' |
| ⋮ | ⋮ | ⋮ |

<STAGING PATTERN SP2>

| TURBINE LOAD L | A-LINE | B-LINE |
|---|---|---|
| 0 | SUPPLY AMOUNT 0 (STOP) | SUPPLY AMOUNT 0 (STOP) |
| ⋮ | ⋮ | ⋮ |
| L1' | SUPPLY AMOUNT 0 (STOP) | SUPPLY AMOUNT Pb1' |
| ⋮ | ⋮ | ⋮ |
| L2' | SUPPLY AMOUNT Pa2' | SUPPLY AMOUNT Pb2' |

※L2'>L1'>0
※Pb1', Pa2', Pb2'>0
※WHEN L > L2', SP1 IS APPLIED.

COMBUSTION CONTROL DEVICE, COMBUSTION SYSTEM, COMBUSTION CONTROL METHOD AND PROGRAM

TECHNICAL FIELD

The present invention relates to a combustion control device, a combustion system, a combustion control method, and a program.

BACKGROUND ART

In general, gas turbine combustion systems adopt a pre-mixing combustion scheme for NOx reduction in many cases. These gas turbine combustion systems have a structure in which one diffusion combustion pilot nozzle at the center and a plurality of premixing nozzles (main nozzles) for performing premixing combustion around the diffusion combustion pilot nozzle are arranged.

In the gas turbine combustion systems based on the premixing combustion scheme, there is a possibility of occurrence of a flashback phenomenon (flashback) in which a flame goes back into a pre-mixer because a fuel temperature enters a combustible region. Accordingly, a design for preventing the flashback phenomenon or a design for enabling immediate restoration by detecting the flashback phenomenon is required to maintain safe operation of a gas turbine combustion system.

For example, a combustion system in which a flashback analysis device analyzes whether flame backflow (a flashback) occurs is disclosed (see Japanese Unexamined Patent Application, First Publication No. Hei 8-68537). The combustion system stops pre-mixing combustion of a main fuel when an analysis result indicates the occurrence of flame backflow and injects the main fuel as a changeover fuel from a pilot fuel nozzle.

TECHNICAL PROBLEM

However, according to the combustion system disclosed in Japanese Unexamined Patent Application, First Publication No. Hei 8-68537, the supply of a fuel of a nozzle in which a flashback occurs is cut off and the cut-off fuel flows out from another nozzle (a pilot fuel nozzle or the like). In this case, although a change in an output of the entire combustion system is small, there is a problem in that an operation in which combustion of a rated value or more in another nozzle is performed may be required for the small change and a high load may be imposed on the device.

SUMMARY OF INVENTION

The present invention has been made in view of such circumstances and an objective of the invention is to provide a combustion control device, a combustion system, a combustion control method, and a program capable of reducing a burden on a device in restoration and stop processes when a flashback occurs.

Solution to Problem

According to a first aspect of the present invention, there is provided a combustion control device which is used in a combustion system and stops the supply of a fuel for staging blocks including a main fuel nozzle in which a flashback occurs based on a detection signal from a flashback detection unit configured to detect the flashback, the combustion control device including: a staging processing unit configured to instruct to supply the fuel or stop the fuel supply for each of the staging blocks based on a staging pattern in which an operating line indicating a correspondence relation between an amount of load of the combustion system and an amount of fuel supply for each of the staging blocks is specified; and a load adjustment unit configured to reduce the amount of load to a level at which the fuel supply for the staging block corresponding to the flashback detection unit is stopped when the detection signal is input from the flashback detection unit.

Also, according to a second aspect of the present invention, in the combustion control device of the first aspect, the load adjustment unit reduces the amount of load to a level which is set to a different value for each staging block for which the fuel supply is stopped.

Also, according to a third aspect of the present invention, in the combustion control device of the first or second aspect, the load adjustment unit stops the combustion system by further reducing the amount of load when the flashback disappears after the process of reducing the load amount.

Also, according to a fourth aspect of the present invention, in the combustion control device of the first or second aspect, the load adjustment unit resumes normal operation of the combustion system by re-increasing the amount of load when the flashback disappears after the process of reducing the amount of load.

Also, according to a fifth aspect of the present invention, the combustion control device of the fourth aspect further includes: a malfunction determination unit configured to determine whether the combustion system malfunctions due to the flashback from a state quantity of the combustion system after the flashback occurs, wherein the load adjustment unit resumes normal operation of the combustion system by re-increasing the amount of load when the load adjustment unit determines that the flashback disappears and that the combustion system does not malfunction after the process of reducing the amount of load.

Also, according to a sixth aspect of the present invention, in the combustion control device of the fifth aspect, the malfunction determination unit determines whether or not the combustion system malfunctions due to the flashback based on a change in the state quantity acquired before the flashback occurs and a change in the state quantity acquired after the flashback occurs.

Also, according to a seventh aspect of the present invention, in the combustion control device according to any one of the fourth of sixth aspects, the staging processing unit switches between fuel supply destinations of a staging block for which the fuel supply is stopped and a staging block which continues a combustion process in which the fuel is supplied when an operation state at a point in time at which the flashback disappears according to a process in which the load adjustment unit reduces the amount of load is off the operating line specified by the staging pattern.

Also, according to an eighth aspect of the present invention, in the combustion control device according to any one of the fourth of sixth aspects, the staging processing unit selects one of a plurality of different staging patterns according to an operation state at a point in time at which the flashback disappears according to a process in which the load adjustment unit reduces the amount of load and instructs to supply the fuel or stop the fuel supply for each of the staging blocks based on the selected staging pattern.

Also, according to a ninth aspect of the present invention, there is provided a combustion system including: the combustion control device according to any one of the first to eighth aspects; and a combustor including: a pilot fuel nozzle configured to extend along an axis and to which a pilot fuel is supplied; a plurality of staging blocks including one or more sets of a plurality of main fuel nozzles extending in parallel to the axis, provided around the pilot fuel nozzle, and to which a main fuel is supplied; a plurality of flashback detection units provided in correspondence with the plurality of staging blocks and configured to detect a flashback occurring in at least one main fuel nozzle constituting the corresponding staging block.

Also, according to a tenth aspect of the present invention, in the combustion system of the ninth aspect, the flashback detection unit is provided for each pair of the main fuel nozzles and arranged so that the flashback occurring in the pair is detectable.

According to an eleventh aspect of the present invention, there is provided a combustion control method which is used in a combustion system and in which the supply of a fuel for staging blocks including a main fuel nozzle in which a flashback occurs is stopped based on a detection signal from a flashback detection unit configured to detect the flashback, the combustion control method including: instructing, by a staging processing unit, to supply the fuel or stop the fuel supply for each of the staging blocks based on a staging pattern in which an operating line indicating a correspondence relation between an amount of load of the combustion system and an amount of fuel supply for each of the staging blocks is specified; and reducing, by a load adjustment unit, the amount of load to a level at which the fuel supply for the staging block corresponding to the flashback detection unit is stopped when the detection signal is input from the flashback detection unit.

According to a twelfth aspect of the present invention, there is provided a program for causing a computer of a combustion control device, which is used in a combustion system and stops the supply of a fuel for staging blocks including a main fuel nozzle in which a flashback occurs based on a detection signal from a flashback detection unit configured to detect the flashback, to function as: a staging processing unit configured to instruct to supply the fuel or stop the fuel supply for each of the staging blocks based on a staging pattern in which an operating line indicating a correspondence relation between an amount of load of the combustion system and an amount of fuel supply for each of the staging blocks is specified; and a load adjustment unit configured to reduce the amount of load to a level at which the fuel supply for the staging block corresponding to the flashback detection unit is stopped when the detection signal is input from the flashback detection unit.

Advantageous Effects of Invention

According to the above-described combustion control device, combustion system, combustion control method, and program, it is possible to reduce a burden on a device in restoration and stop processes when a flashback occurs.

BRIEF DESCRIPTION OF DRAWINGS

FIG. 4 is a diagram illustrating an example of a staging pattern according to the first embodiment.

FIG. 17A is a first diagram illustrating an example of a staging pattern according to the fifth embodiment.

FIG. 17B is a second diagram illustrating an example of a staging pattern according to the fifth embodiment.

DESCRIPTION OF EMBODIMENTS

<First Embodiment>

Hereinafter, an example of a combustion system according to the first embodiment will be described with reference to the drawings.

Figure 1:
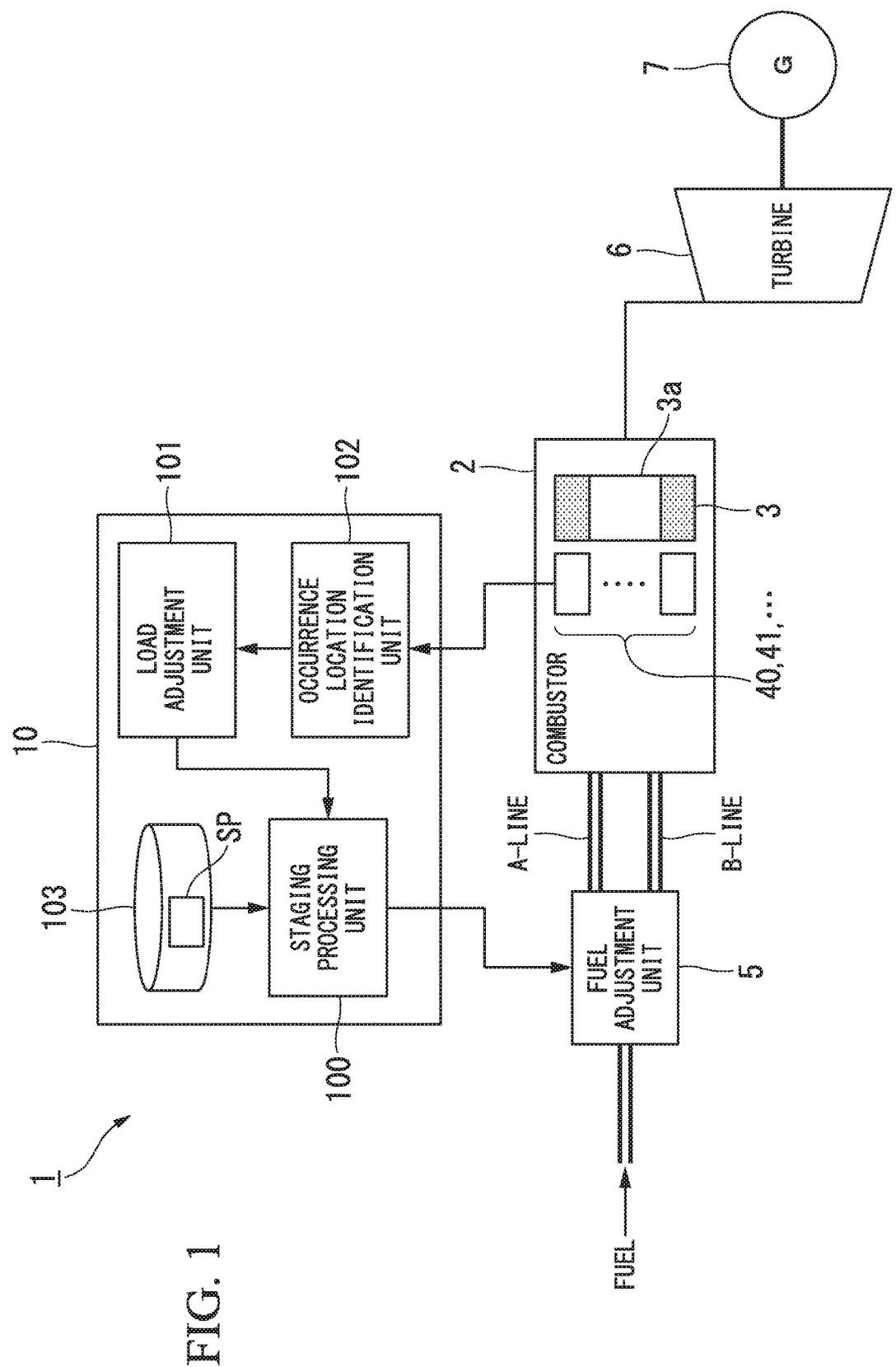
FIG. 1 is a schematic diagram illustrating a functional configuration of a combustion system according to a first embodiment.

FIG. 1 is a schematic diagram illustrating a functional configuration of the combustion system according to the first embodiment.

As illustrated in FIG. 1, the combustion system 1 according to the first embodiment includes a combustion control device 10, a combustor 2, and a fuel adjustment unit 5.

The combustion system 1 is a device which burns a fuel such as kerosene or natural gas and generates power. The combustion system 1 can rotate a turbine 6 through the generated power and produce the power through an electric generator 7.

The combustion control device 10 is a functional unit which manages operation of the entire combustion system 1 and controls the supply of a fuel to the combustor 2 based on a predetermined staging pattern (to be described below) and controls an output of the combustor 2 according to a necessary turbine load L.

The combustor 2 generates thermal energy by actually burning the fuel to be supplied. The combustor 2 adopts a premixing combustion scheme for reducing an amount of NOx emission and is configured to include a pilot fuel nozzle 3a configured to perform diffusion combustion by ejecting a pilot fuel to a combustion room and a plurality of main fuel nozzle groups 3 configured to perform premixing combustion after premixing a main fuel with combustion air with the diffusion combustion. In addition, the combustor 2 is configured so that the fuel is supplied for every two fuel supply lines (A- and B-lines) for the main fuel nozzle group 3 (see FIG. 2).

The fuel adjustment unit 5 adjusts an amount of fuel supply for the combustor 2 according to a control signal from the combustion control device 10. Specifically, the fuel adjustment unit 5, for example, is a flow adjustment valve provided at each position of a piping constituting a fuel supply line (A- or B-line or the like (FIG. 1)). The fuel adjustment unit 5 can independently adjust the amount of fuel adjustment through each of the A- and B-lines. Thereby, the combustion control device 10 can independently control each of the amount of fuel supply through the A-line and the amount of fuel supply through the B-line by outputting a desired control signal to the fuel adjustment unit 5.

As illustrated in FIG. 1, a plurality of flashback detection units 40, 41, . . . are provided in the combustor 2. The flashback detection units 40, 41, . . . detect flashbacks (flashback phenomena) occurring in the main fuel nozzle group 3. Here, the flashback is a phenomenon in which a flame goes back upstream (see FIG. 2). Premixing combustion for burning premixed gases narrows a stable combustion range and a position at which a flame is formed moves to the upstream side according to fluid velocity variation or a change in an air-fuel ratio due to an increase/decrease of a flow rate of a premixed gas, which may cause a flashback phenomenon.

The flashback detection units 40, 41, . . . detect the occurrence of this flashback and output a detection signal to the combustion control device 10. Specifically, the flashback detection units 40, 41, . . . , for example, detect the occurrence of the flashback by acquiring a light-emitting spectrum of the flame through an optical detection means (an optical fiber or the like).

Also, the flashback detection units 40, 41, . . . may detect the occurrence of the flashback through other means (for example, a temperature sensor or the like).

As illustrated in FIG. 1, the combustion control device 10 includes a staging processing unit 100, a load adjustment unit 101, an occurrence location identification unit 102, and a storage unit 103 in which a predetermined staging pattern SP is stored.

The staging processing unit 100 instructs the fuel adjustment unit 5 to supply fuel or stop the fuel supply for each of the main fuel nozzle groups 3 (staging blocks 3A and 3B to be described below) based on the staging pattern SP prestored in the storage unit 103.

Also, the load adjustment unit 101 reduces an amount of load to a level at which the fuel supply for the staging blocks 3A and 3B in which the flashback occurs is stopped when the occurrence location identification unit 102 identifies the staging blocks 3A and 3B in which the flashback occurs.

The occurrence location identification unit 102 identifies a staging block in which the flashback occurs by identifying the staging blocks 3A and 3B corresponding to the flashback detection units 40, 41, . . . outputting the detection signal when the detection signal is input from any one of the flashback detection units 40, 41, . . . .

Specific processing content of the staging pattern SP, the staging processing unit 100, and the load adjustment unit 101 will be described below with reference to FIGS. 4, 5A, and 5B.

Figure 2:
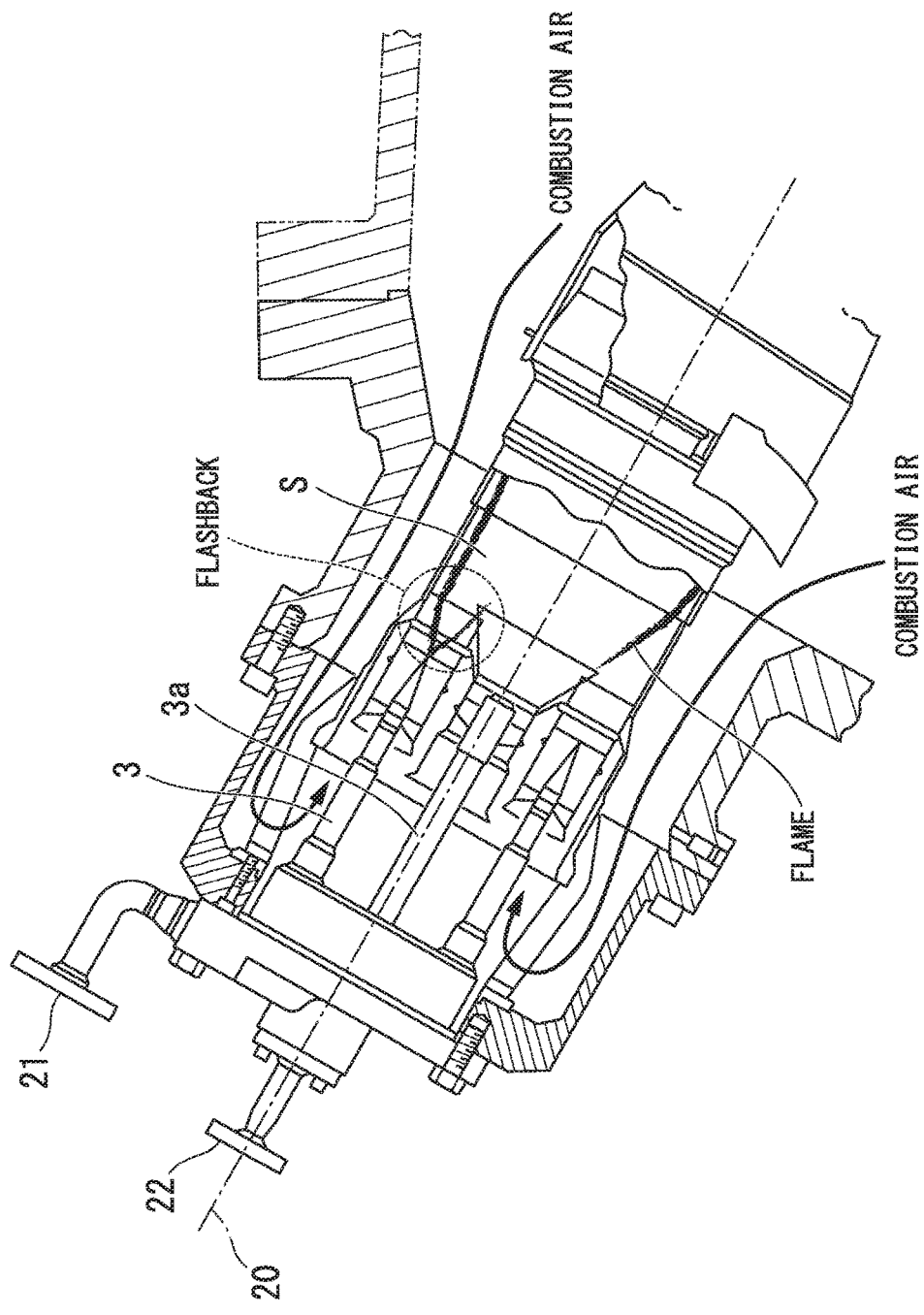
FIG. 2 is a diagram illustrating a structure of a combustor according to the first embodiment.

FIG. 2 is a diagram illustrating a structure of the combustor according to the first embodiment.

As illustrated in FIG. 2, the combustor 2 includes a pilot fuel nozzle 3a having a cone which extends along an axis 20, in which a pilot fuel is burned, and which forms a diffusion flame. Around the pilot fuel nozzle 3a, a plurality of main fuel nozzle groups 3 for forming a pre-mixed flame by forming and jetting a pre-mixed gas of a main fuel and combustion air are arranged to extend in parallel to the axis 20. The main fuel nozzle groups 3 are provided as described above, so that a temperature of a combustion gas to be discharged is increased by controlling a combustion temperature through combustion of the pre-mixed gas.

Also, the combustor 2 forms a diffusion flame of a cone shape in a combustion room S during normal operation, but the flame goes back to a tip of the main fuel nozzle group 3 when a flashback occurs (FIG. 2).

Also, a main fuel is supplied from a main fuel supply port 21 and a pilot fuel is supplied from a pilot fuel supply port 22. In addition, the main fuel is supplied for each predetermined main fuel nozzle group 3 (each staging block) through two fuel supply lines (see FIG. 3).

Figure 3:
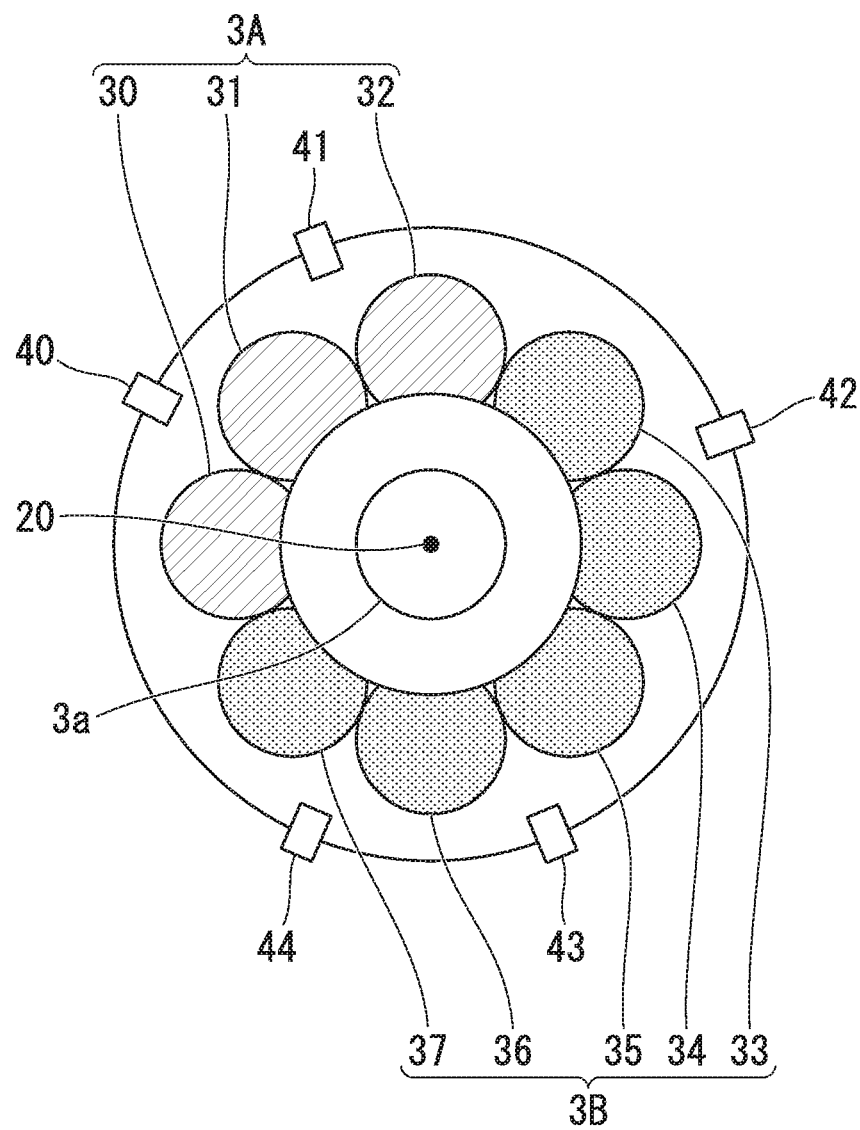
FIG. 3 is a diagram schematically illustrating a structure of a main fuel nozzle group and flashback detection units according to the first embodiment.

FIG. 3 is a diagram schematically illustrating a structure of the main fuel nozzle group and the flashback detection units according to the first embodiment.

FIG. 3 schematically illustrates a state of the pilot fuel nozzle 3a and the main fuel nozzle group 3 in FIG. 2 from the front (in a direction along the axis 20).

As illustrated in FIG. 3, the main fuel nozzle group 3 (eight main fuel nozzles 30 to 37) is arranged circumferentially with a center pilot fuel nozzle 3a at the center. Here, three main fuel nozzles 30, 31, and 32 constitute a staging block 3A to which the fuel is supplied through the above-described A-line and the remaining five main fuel nozzles 33 to 37 constitute a staging block 3B to which the fuel is supplied through the B-line. That is, the main fuel nozzles 30 to 37 are configured to perform the ignition after the fuel is supplied for both staging blocks 3A and 3B.

In addition, as illustrated in FIG. 3, a plurality of flashback detection units 40, 41, . . . , 44 are provided inside the combustor 2 and the flashback detection unit 40 to 44 are provided to correspond to both staging blocks 3A and 3B constituted of a plurality of main fuel nozzles 30 to 37.

For example, the flashback detection unit 40 illustrated in FIG. 3 is provided between the main fuel nozzles 30 and 31 and outputs the detection signal to the combustion control device 10 when the flashback occurs in the main fuel nozzles 30 and 31. Likewise, the flashback detection unit 42 is provided between the main fuel nozzles 33 and 34, and outputs the detection signal to the occurrence location identification unit 102 of the combustion control device 10 when the flashback occurs in the main fuel nozzles 33 and 34. Thereby, the occurrence location identification unit 102 can identify the staging block 3A or 3B at which the flashback occurs by determining any one of the flashback detection units 40 to 44 inputting the detection signal. For example, when the detection signal is input from the flashback detection unit 40 or 41, the combustion control device 10 can recognize that the flashback occurs in any one of the main fuel nozzles 30, 31, and 32 belonging to the staging block 3A.

Also, as illustrated in FIG. 3, the flashback detection units 40 to 44 are provided for each pair of the main fuel nozzles 30 to 37 and arranged so that the flashback occurring in the pair are detectable, and therefore the number of arrangements of the flashback detection units 40 to 44 can be reduced. However, a method of arranging the flashback detection units 40 to 44 is not limited to the aspect of FIG. 3. For example, the arrangement method may be an aspect in which the flashback detection units 40, 41, . . . are provided to correspond to the main fuel nozzles 30, 31, . . . , respectively.

FIG. 4 is a diagram illustrating an example of a staging pattern according to the first embodiment.

The staging pattern SP stored in the storage unit 103 is a program in which an operating line indicating a correspondence relation between an amount of load for the combustion system 1 and an amount of fuel supply for each of the staging blocks 3A and 3B is specified. Also, a state in which the operation (fuel supply) is performed based on the staging pattern SP is expressed as "on the operating line" or the like and a state in which the operation (fuel supply) is not performed based on the staging pattern SP is expressed as "off the operating line" or the like.

The staging processing unit 100 performs the fuel supply according to a turbine load L based on the staging pattern SP. For example, when the turbine load L is 0, the fuel supply for the A-line (staging block 3A) and the fuel supply for the B-line (staging block 3B) are zero together according to the staging pattern SP. When the load adjustment unit 101 increases the turbine load L from here, the staging processing unit 100 first supplies the fuel to the A-line based on the staging pattern SP and executes a combustion process in the staging block 3A. Here, for example, an amount of fuel supply for the A-line is Pa1 when the turbine load L is assumed to be L1.

Next, when the load L reaches L2 from L1 (L1<L2), a fuel supply destination is switched to the B-line and the combustion process in the staging block 3B is performed. Further, when the load L reaches from L2 to L3, the fuel supply for the A-line starts again and the combustion process is performed in both of the staging blocks 3A and 3B.

As described above, the combustion system 1 is operated while setting amounts of fuel supply for the A- and B-lines and amounts of combustion in the staging blocks 3A and 3B according to an increase of the turbine load L based on a staging pattern SP specified in advance.

Figure 5A:
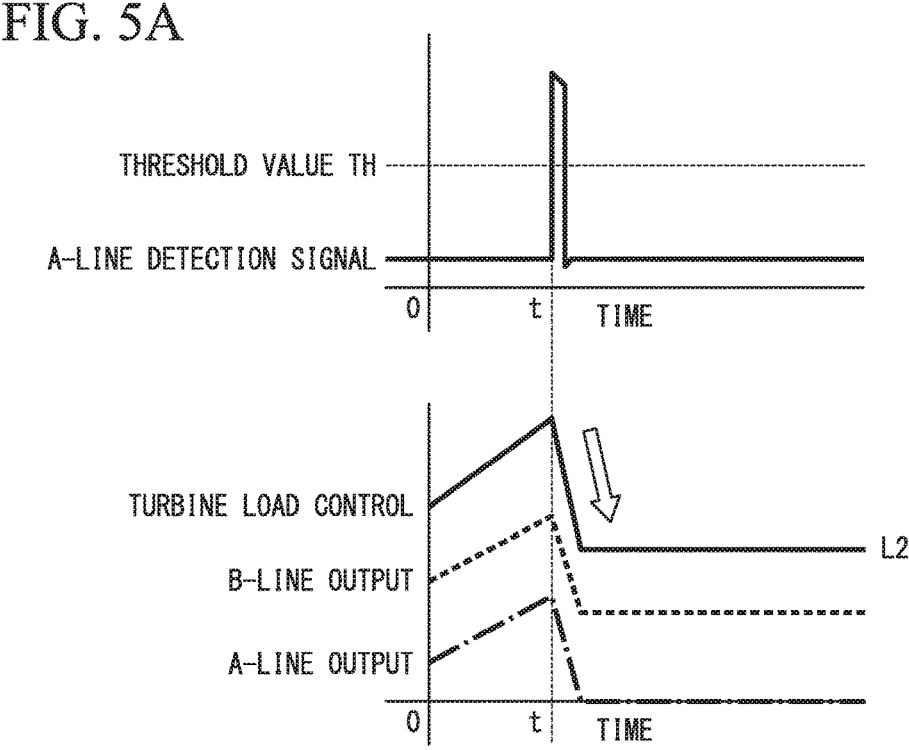
FIG. 5A is a first diagram illustrating a function of a combustion control device according to the first embodiment.
Figure 5B:
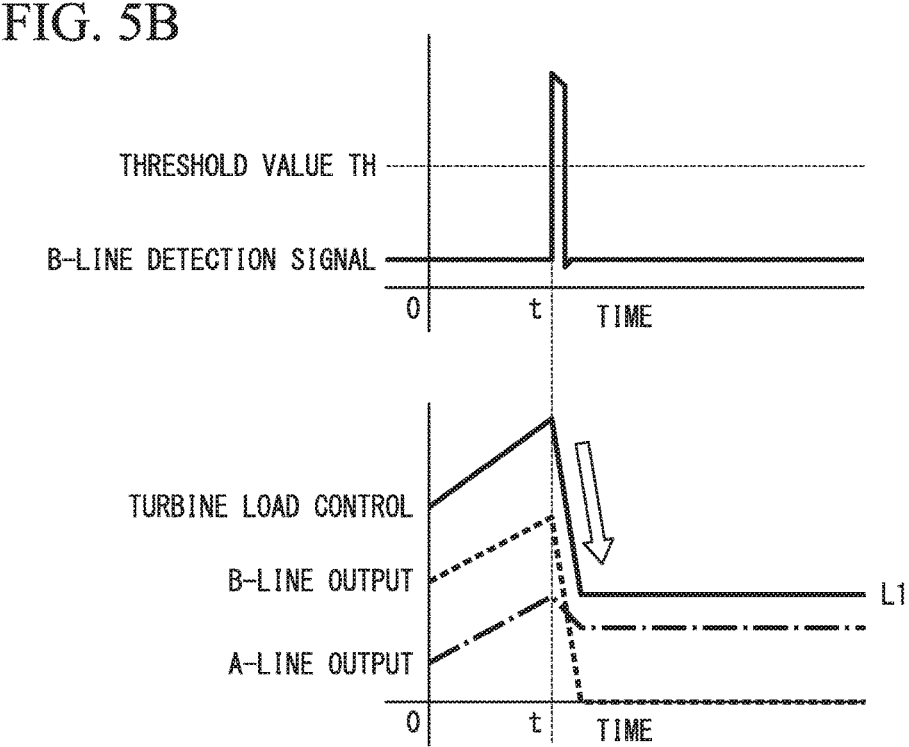
FIG. 5B is a second diagram illustrating a function of the combustion control device according to the first embodiment.

FIGS. 5A and 5B are first and second diagrams illustrating a function of the combustion control device according to the first embodiment.

In upper portions of FIGS. 5A and 5B, the time transition of the detection signal output by any one of the flashback detection units 40 to 44 (FIG. 3) is illustrated. In lower portions of FIGS. 5A and 5B, the adjustment of the turbine load L by the load adjustment unit 101 and the time transitions of amounts of fuel supply for the A- and B-lines which change based on the adjustment of the turbine load L are illustrated.

Here, an example of the case in which the flashback occurs in any one of the main fuel nozzles 30, 31, and 32 (FIG. 3) belonging to the staging block 3A at a certain time t during the operation of the combustion system 1 will be described with reference to FIG. 5A.

When the flashback occurs in the staging block 3A at time t, any one of the flashback detection units 40 and 41 first outputs a detection signal greater than a predetermined threshold value TH (see the upper portion of FIG. 5A). The occurrence location identification unit 102 to which the detection signal greater than the threshold value TH is input receives information indicating that an output source of the detection signal is the flashback detection unit 40 or 41, determines that the flashback occurs in the staging block 3A (A-line), and notifies the load adjustment unit 101 of the occurrence of the flashback in the staging block 3A. The load adjustment unit 101 immediately reduces the turbine load L to L2 to stop the fuel supply for the staging block 3A (see the lower portion of FIG. 5A).

Next, the staging processing unit 100 performs the fuel supply according to the turbine load L2 immediately after the reduction in response to the process of reducing the turbine load L. Specifically, based on the staging pattern SP (FIG. 4), the staging processing unit 100 sets the fuel supply for the B-line to Pb2 and sets the fuel supply for the A-line to zero (stop).

Thereby, a process in which the fuel supply for the A-line is stopped immediately at the moment at which the flashback occurs in the staging block 3A is performed and it is possible to stop combustion in the staging block 3A.

Likewise, an example of the case in which the flashback occurs in any one of the main fuel nozzles 33 to 37 (FIG. 3) belonging to the staging block 3B at a certain time t during the operation of the combustion system 1 will be described with reference to FIG. 5B.

When the flashback occurs in the staging block 3B at time t, any one of the flashback detection units 42, 43, and 44 first outputs a detection signal greater than the predetermined threshold value TH (see the upper portion of FIG. 5B). The occurrence location identification unit 102 to which the detection signal greater than the threshold value TH is input receives information indicating that an output source of the detection signal is any one of the flashback detection units 42, 43, and 44, determines that the flashback occurs in the staging block 3B (B-line), and notifies the load adjustment unit 101 of the occurrence of the flashback in the staging block 3B. The load adjustment unit 101 immediately reduces the turbine load L to L1 to stop the fuel supply for the staging block 3B (see the lower portion of FIG. 5B).

Next, the staging processing unit 100 performs the fuel supply according to the turbine load L1 immediately after the reduction in response to the process of reducing the turbine load L. Specifically, based on the staging pattern SP (FIG. 4) the staging processing unit 100 sets the fuel supply for the A-line to Pa1 and sets the fuel supply for the B-line to zero (stop).

Thereby, a process in which the fuel supply for the B-line is stopped immediately at the moment at which the flashback occurs in the staging block 3B is performed and it is possible to stop combustion in the staging block 3B.

As described above, the load adjustment unit 101 reduces an amount of load to a different level L1 or L2 for each staging block 3A and 3B for which the fuel supply is stopped based on an operating line specified by the staging pattern SP.

Figure 6:
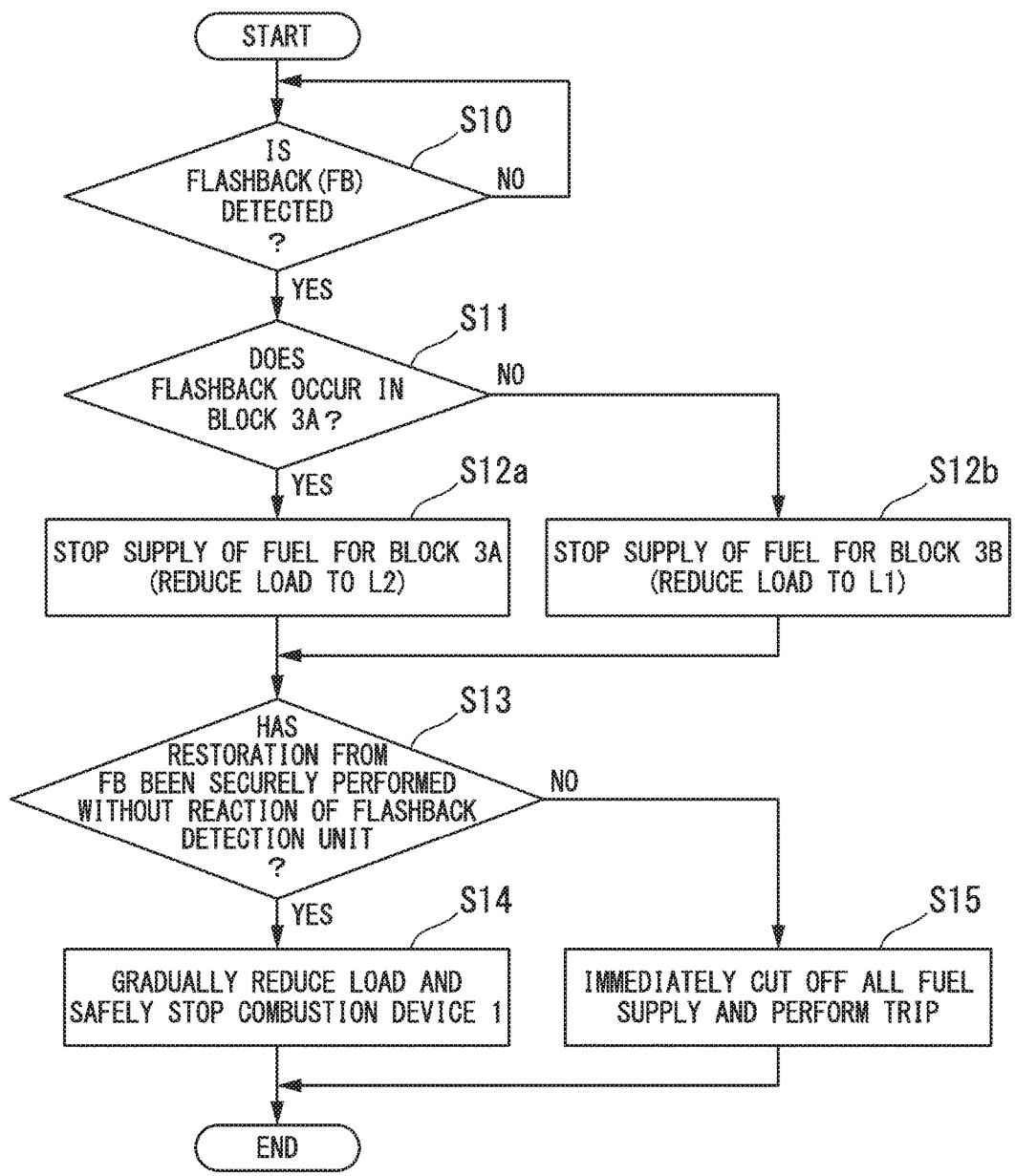
FIG. 6 is a diagram illustrating a processing flow of the combustion control device according to the first embodiment.

FIG. 6 is a diagram illustrating a processing flow of the combustion control device according to the first embodiment.

The processing load illustrated in FIG. 6 starts at the time of normal operation of the combustion system 1, that is, when combustion is performed normally in the combustion room S (FIG. 2) through the fuel supply.

The occurrence location identification unit 102 (FIG. 1) of the combustion control device 10 monitors the detection signal from each of the flashback detection units 40 to 44 (FIG. 3) and detects the occurrence of the flashback in the main fuel nozzle group 3 by determining whether the detection signal is greater than the threshold value TH (step S10). Here, when the occurrence of the flashback is not detected (step S10: NO), the occurrence location identification unit 102 continues the monitoring of the detection signal without a break.

On the other hand, when the occurrence of the flashback is detected (step S10: YES), the combustion control device 10 immediately proceeds to step S11 and a subsequent process for removing the flashback.

Specifically, when the occurrence of the flashback is detected, the occurrence location identification unit 102 determines a staging block in which the flashback occurs by identifying the flashback detection units 40 to 44 outputting the detection signal which is greater than the threshold value TH (step S11).

When the occurrence location identification unit 102 determines that the flashback occurs in the staging block 3A (step S11: YES), the load adjustment unit 101 reduces the turbine load L to L2 when a signal indicating the occurrence of the flashback in the staging block 3A is input from the occurrence location identification unit 102. Then, the staging processing unit 100 stops the fuel supply for the staging block 3A via the A-line according to a change of the turbine load L to L2 (step S12a, see FIG. 4).

On the other hand, when the occurrence location identification unit 102 determines that the flashback occurs in the staging block 3B (step S11: NO), the load adjustment unit 101 reduces the turbine load L to L1 when a signal indicating the occurrence of the flashback in the staging block 3B is input from the occurrence location identification unit 102. Then, the staging processing unit 100 stops the fuel supply for the staging block 3B via the B-line according to a change of the turbine load L to L1 (step S12a, see FIG. 4).

Subsequently, the occurrence location identification unit 102 continuously monitors the detection signal from each of the flashback detection units 40 to 44 and determines whether the flashback has totally disappeared after the process of step S12a or S12b (step S13).

Here, when the occurrence location identification unit 102 determines that the flashback has totally disappeared after the process of step S12a or S12b (step S13: YES), the load adjustment unit 101 gradually decreases the turbine load L and also gradually decreases the fuel supply for the side at which combustion continues between the staging blocks 3A and 3B to stop the fuel supply (step S14). As described above, the load adjustment unit 101 performs a stop process of its own device by further decreasing an amount of load, so that the combustion system 1 can safely perform the stop on a normal operating line without performing a trip (sudden stop of combustion in an emergency).

On the other hand, when it is determined that the flashback has not totally disappeared after the process of step S12a or S12b (step S13: NO), the occurrence location identification unit 102 immediately cuts off all the fuel supply and performs the trip as an emergency combustion stop means (step S15).

As described above, when the flashback occurs, the combustion system 1 according to this embodiment immediately identifies an occurrence location of the flashback (step S11) and partially stops the fuel supply (steps S12a and S12b). When it is detected that the fuel supply is partially stopped and the flashback appropriately disappears, the combustion system I safely stops the combustion process by the remaining part to check the safety of the device (step S14).

As described above, because the combustion system 1 can safely stop its own device without performing the trip even when the flashback occurs, it is possible to reduce a burden on the combustion system 1 itself in the restoration and stop processes when the flashback occurs and consequently improve the life of the device. Also, when the trip which is the sudden stop process in an emergency is performed, it is known that the wear and durability deterioration of the device are caused by a sudden temperature change and the life of the device deteriorates.

In addition, the combustion system 1 according to this embodiment partially stops the fuel supply and is restored from a flashback occurrence state by appropriately adjusting only the turbine load L according to the staging block in which the flashback occurs under the processing of the load adjustment unit 101. Thereby, the processing when the flashback occurs is simplified and it is possible to improve the reliability of the entire control system of the combustion system 1.

<Second Embodiment>

Next, an example of a combustion system according to the second embodiment will be described with reference to the drawings.

Figure 7:
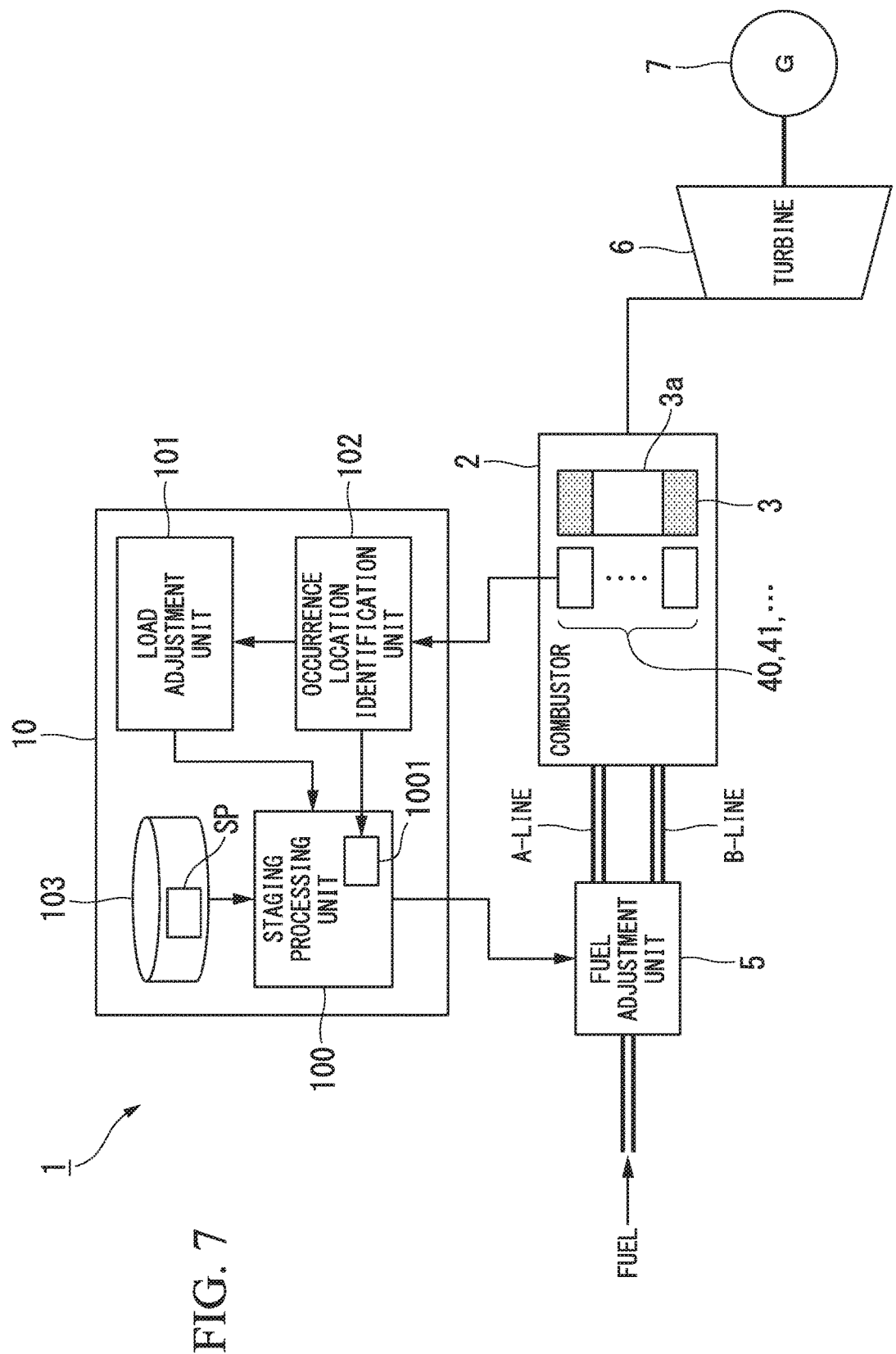
FIG. 7 is a schematic diagram illustrating a functional configuration of a combustion system according to a second embodiment.

FIG. 7 is a schematic diagram illustrating a functional configuration of the combustion system according to the second embodiment.

As illustrated in FIG. 7, the combustion system 1 according to the second embodiment includes a combustion control device 10, a combustor 2, and a fuel adjustment unit 5 as in the first embodiment (FIG. 1). The same functional elements as those of the first embodiment are assigned the same reference signs and description thereof will be omitted.

In FIG. 7, the combustion system 1 according to this embodiment is different from that of the first embodiment in that a staging processing unit 100 includes a block selection unit 1001.

When information of a staging block 3A or 3B in which a flashback occurs is received from the occurrence location identification unit 102, the block selection unit 1001 selects one staging block in which no flashback occurs from the staging blocks 3A and 3B. The staging processing unit 100 controls the fuel adjustment unit 5 so that combustion continues in only the staging block selected by the block selection unit 1001.

Here, because the staging blocks 3A and 3B according to this embodiment are assigned identical numbers of main fuel nozzle groups 3 as will be described below, each staging block can perform equivalent combustion in any stage of the staging pattern SP.

Figure 8:
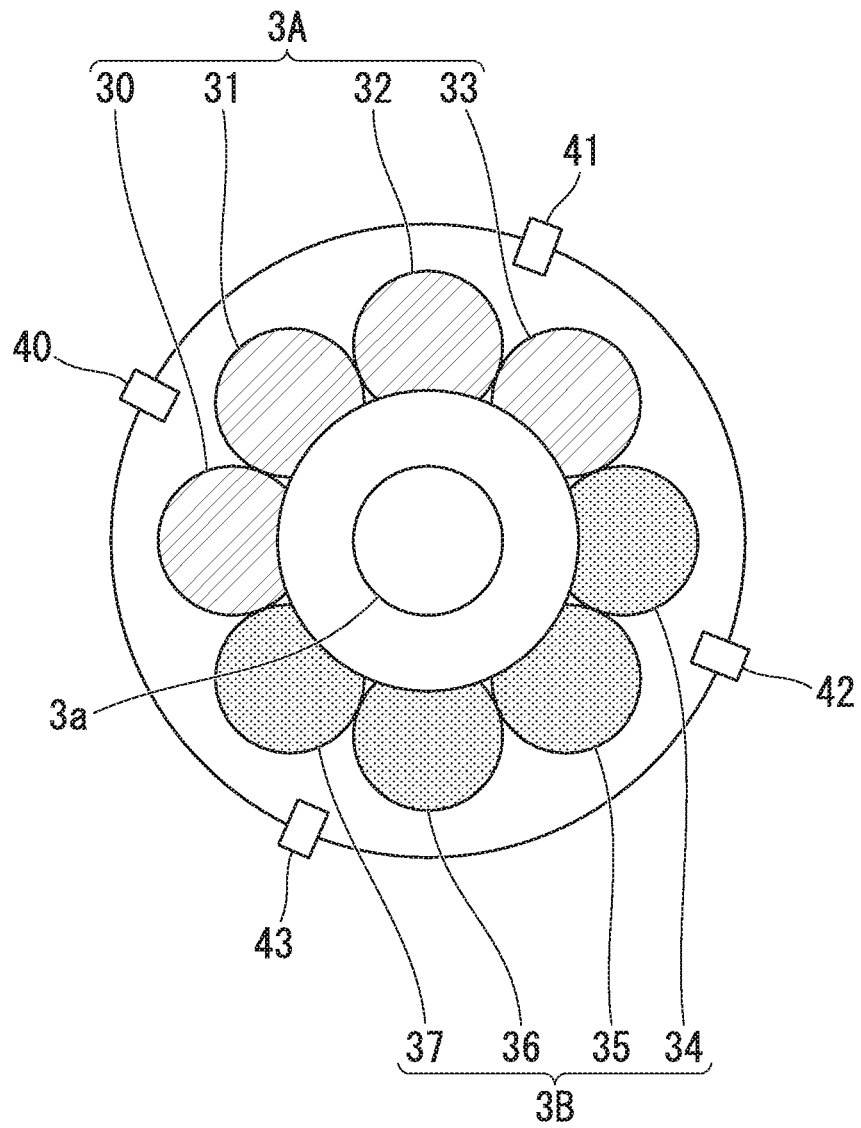
FIG. 8 is a diagram schematically illustrating a structure of a main fuel nozzle group and flashback detection units according to the second embodiment.

FIG. 8 is a diagram schematically illustrating a structure of the main fuel nozzle group and the flashback detection units according to the second embodiment.

Like FIG. 3 in the first embodiment, FIG. 8 schematically illustrates a state of the pilot fuel nozzle 3a and the main fuel nozzle group 3 in FIG. 2 from the front (a direction along an axis 20).

As illustrated in FIG. 8, four main fuel nozzles 30 to 33 constitute a staging block 3A to which the fuel is supplied through an A-line and the remaining four main fuel nozzles 34 to 37 constitute a staging block 3B to which the fuel is supplied through a B-line. That is, unlike the first embodiment, the staging blocks 3A and 3B are configured to have identical numbers of (four) main fuel nozzle groups 3.

In addition, as illustrated in FIG. 8, a plurality of flashback detection units 40, 41, 42, and 43 are provided inside the combustor 2 and the flashback detection units 40, 41, 42, and 43 are provided to correspond to both staging blocks 3A and 3B constituted of a plurality of main fuel nozzles 30 to 37.

For example, the flashback detection units 40 and 41 illustrated in FIG. 8 output detection signals to the combustion control device 10 when the flashback occurs in the main fuel nozzles 30 to 33 (staging block 3A). Likewise, the flashback detection units 42 and 43 output detection signals to an occurrence location identification unit 102 of the combustion control device 10 when the flashback occurs in the main fuel nozzles 34 to 37 (staging block 3B). Thereby, the occurrence location identification unit 102 can identify the staging block 3A or 3B at which the flashback occurs by determining any one of the flashback detection units 40 to 43 inputting the detection signal.

Also, an arrangement method of the flashback detection units 40 to 43 is not limited to the aspect of FIG. 8. For example, the arrangement method may be an aspect in which the flashback detection units 40, 41, . . . are provided to correspond to the main fuel nozzles 30, 31, . . . .

Figure 9A:
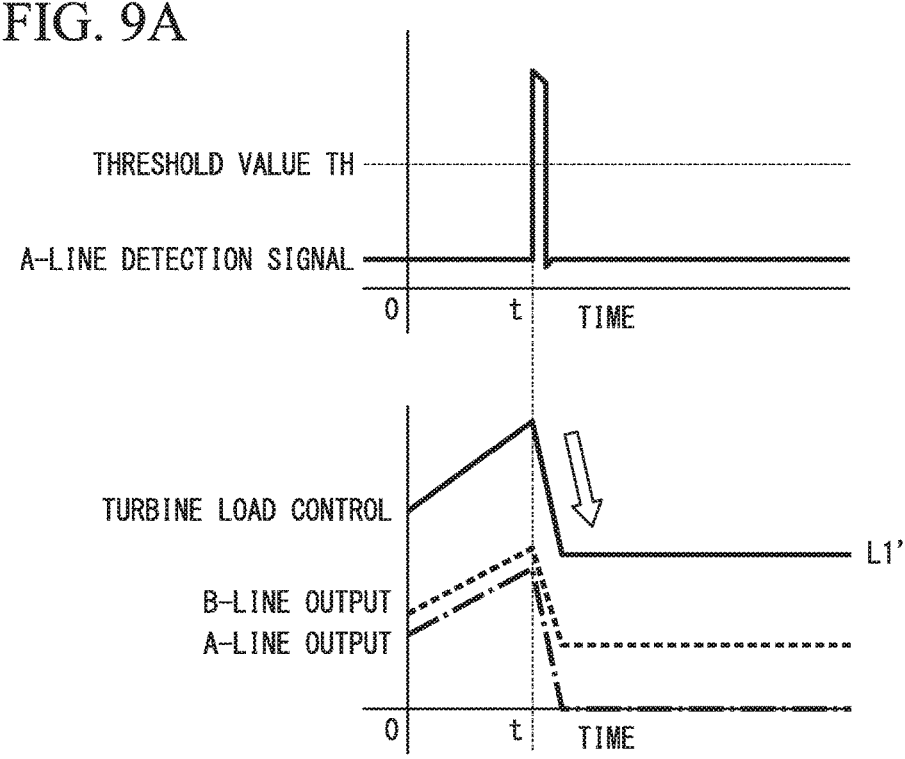
FIG. 9A is a first diagram illustrating a function of a combustion control device according to the second embodiment.
Figure 9B:
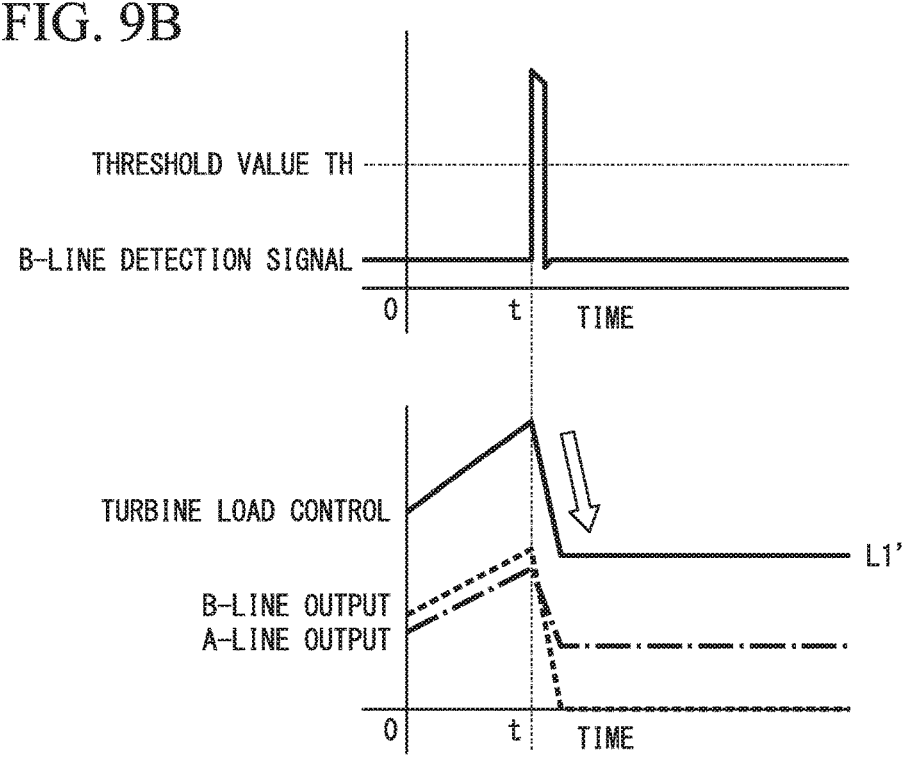
FIG. 9B is a second diagram illustrating a function of the combustion control device according to the second embodiment.

FIGS. 9A and 9B are first and second diagrams illustrating a function of a combustion control device according to the second embodiment.

A time change in a detection signal output by any one of the flashback detection units 40 to 43 (FIG. 8) is illustrated in the upper portions of FIGS. 9A and 9B and the adjustment of the turbine load L by the load adjustment unit 101 and a time change in an amount of fuel supply for the A- or B-line which changes based on the adjustment are illustrated in the lower portions of FIGS. 9A and 9B.

Here, an example in which the flashback occurs in any one of the main fuel nozzles 30 to 33 (FIG. 8) belonging to the staging block 3A at a certain time t during operation of the combustion system 1 will be described with reference to FIG. 9A.

When the flashback occurs in the staging block 3A at the certain time t, either of the flashback detection units 40 and 41 first outputs a detection signal greater than a predetermined threshold value TH (see an upper portion on FIG. 9A). The occurrence location identification unit 102 to which the detection signal greater than the threshold value TH is input receives information indicating that an output source of the detection signal is the flashback detection unit 40 or 41, determines that the flashback occurs in the staging block 3A (A-line), and notifies the load adjustment unit 101 of the determination result. When the notification is input, the load adjustment unit 101 according to this embodiment decreases the load to a compatible turbine load L1' (the lower portion of FIG. 9A) in combustion of only one of the staging blocks 3A and 3B.

On the other hand, the occurrence location identification unit 102 also notifies the block selection unit 1001 of the staging processing unit 100 of the determination indicating that the flashback occurs in the staging block 3A. The block selection unit 1001 selects a staging block (staging block 3B) of the side on which the flashback does not occur according to this notification. The staging processing unit 100 according to this embodiment performs combustion corresponding to the turbine load L1' set by the load adjustment unit 101 according to combustion of only the staging block 3B selected by the block selection unit 1001 (see the lower portion of FIG. 9A).

Thereby, a process in which the fuel supply for the A-line is stopped is performed immediately at the moment at which the flashback occurs in the staging block 3A and it is possible to stop the combustion in the staging block 3A.

Likewise, an example in which the flashback occurs in any one of the main fuel nozzles 34 to 37 (FIG. 8) belonging to the staging block 3B at a certain time t during operation of the combustion system 1 will be described with reference to FIG. 9B.

When the flashback occurs in the staging block 3B at the certain time t, either of the flashback detection units 42 and 43 first outputs a detection signal greater than a predetermined threshold value TH (see an upper portion on FIG. 9B). The occurrence location identification unit 102 to which the detection signal greater than the threshold value TH is input receives information indicating that an output source of the detection signal is the flashback detection unit 42 or 43, determines that the flashback occurs in the staging block 3B (B-line), and notifies the load adjustment unit 101 of the determination result. At this time, the load adjustment unit 101 according to this embodiment decreases the load to the same turbine load L1' (the lower portion of FIG. 9B) as in the case of FIG. 9A.

On the other hand, the occurrence location identification unit 102 also notifies the block selection unit 1001 of the determination indicating that the flashback occurs in the staging block 3B. The block selection unit 1001 selects a staging block (staging block 3A) of the side on which the flashback does not occur according to this notification. The staging processing unit 100 according to this embodiment performs combustion corresponding to the turbine load L1' set by the load adjustment unit 101 according to combustion of only the staging block 3A selected by the block selection unit 1001 (see the lower portion of FIG. 9B).

Thereby, a process in which the fuel supply for the B-line is stopped is performed immediately at the moment at which the flashback occurs in the staging block 3B and it is possible to stop the combustion in the staging block 3B.

Also, each process of the combustion control device 10 described using FIGS. 9A and 9B corresponds to a fuel supply stop process (step S12a or S12b) for the staging block 3A or 3B in the processing flow (FIG. 6) in the first embodiment. Because the other processing steps in the processing flow of the combustion control device 10 according to this embodiment are similar to those of the first embodiment, description thereof will be omitted.

As described above, the combustion system 1 according to the second embodiment can also reduce the burden on the combustion system 1 itself and consequently improve the life of the device because it is possible to safely stop its own device without performing a trip even when the flashback occurs.

Also, because the staging blocks 3A and 3B have mutually equivalent combustion capabilities in the combustion system 1 according to this embodiment, combustion may be in any of the staging blocks 3A and 3B if a compatible turbine load (turbine load L1') is in a single staging block. Therefore, because the load adjustment unit 101 need not change a value of the turbine load L in accordance with a staging block in which the flashback occurs, it is possible to further simplify a process when a flashback occurs.

<Third Embodiment>

Next, an example of a combustion system according to the third embodiment will be described with reference to the drawings.

Figure 10:
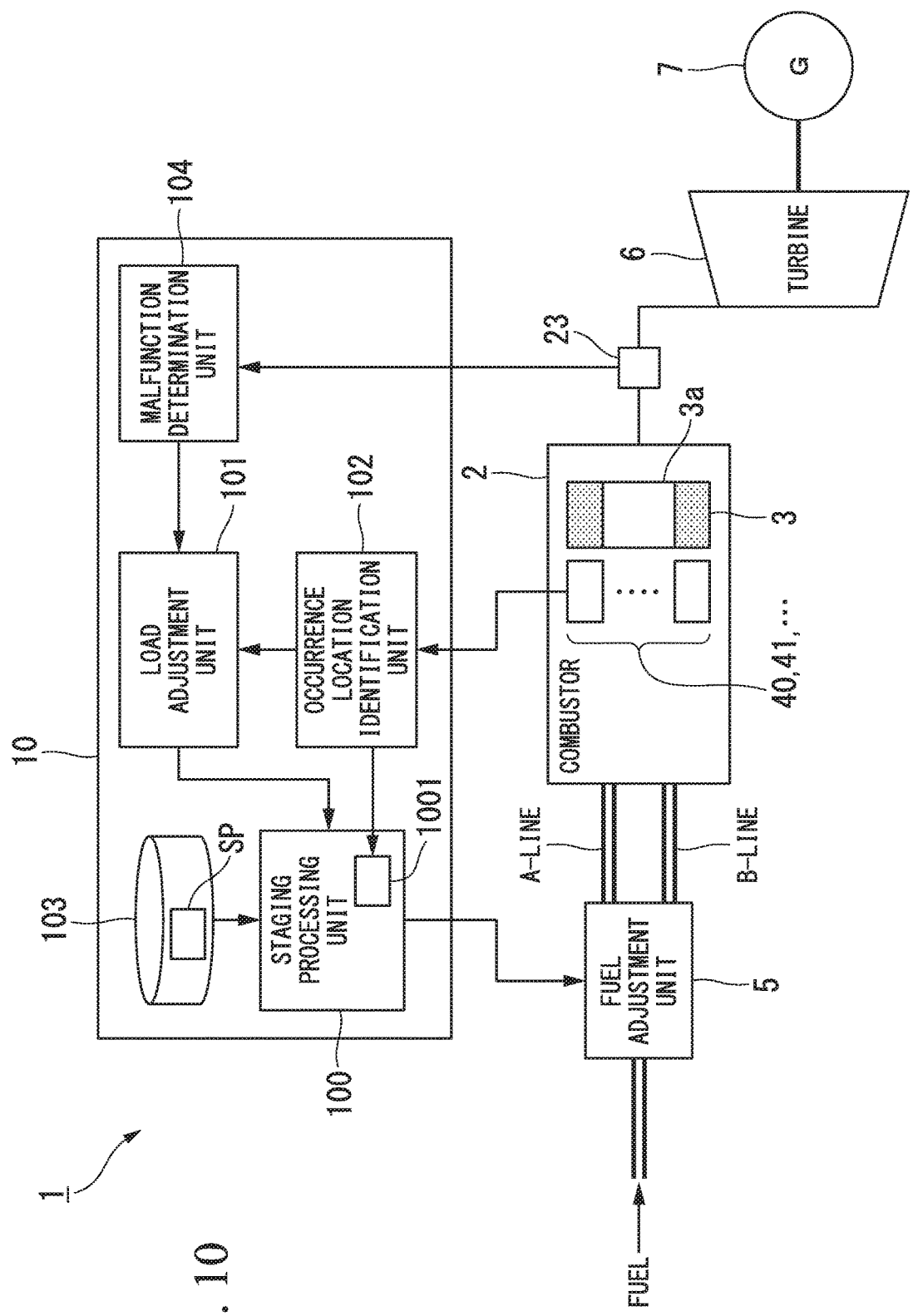
FIG. 10 is a schematic diagram illustrating a functional configuration of a combustion system according to a third embodiment.

FIG. 10 is a schematic diagram illustrating a functional configuration of the combustion system according to the third embodiment.

As illustrated in FIG. 10, the combustion system 1 according to the third embodiment includes a combustion control device 10, a combustor 2, and a fuel adjustment unit 5 as in the first embodiment (FIG. 1) and the second embodiment (FIG. 7). Also, the same functional elements as those of the first and second embodiments are assigned the same reference signs and description thereof will be omitted.

In FIG. 10, the combustion system 1 according to this embodiment is different from the second embodiment in that the combustion control device 10 includes a malfunction determination unit 104, and a state quantity sensor 23 is provided in a flow path of a combustion gas from the combustor 2.

After the flashback occurs, the malfunction determination unit 104 indirectly determines whether or not the combustor 2 is damaged due to the flashback from a state quantity of the combustion system 1. This state quantity is a parameter acquired through the state quantity sensor 23. Specifically, for example, the state quantity is a composition of an exhaust gas (a concentration of NOx, CO, or the like) flowing from the combustor 2 to the turbine 6.

Hereinafter, in this embodiment, an example in which the state quantity sensor 23 is a gas sensor capable of acquiring a NOx concentration of an exhaust gas will be described. Here, the state quantity sensor 23 may additionally be a vibration sensor which detects the vibration of the combustion system 1 during a combustion process, a temperature sensor which acquires a temperature distribution of a metal, a combination thereof or the like. The malfunction determination unit 104 can also modify a parameter serving as an evaluation target according to modification thereof.

Figure 11:
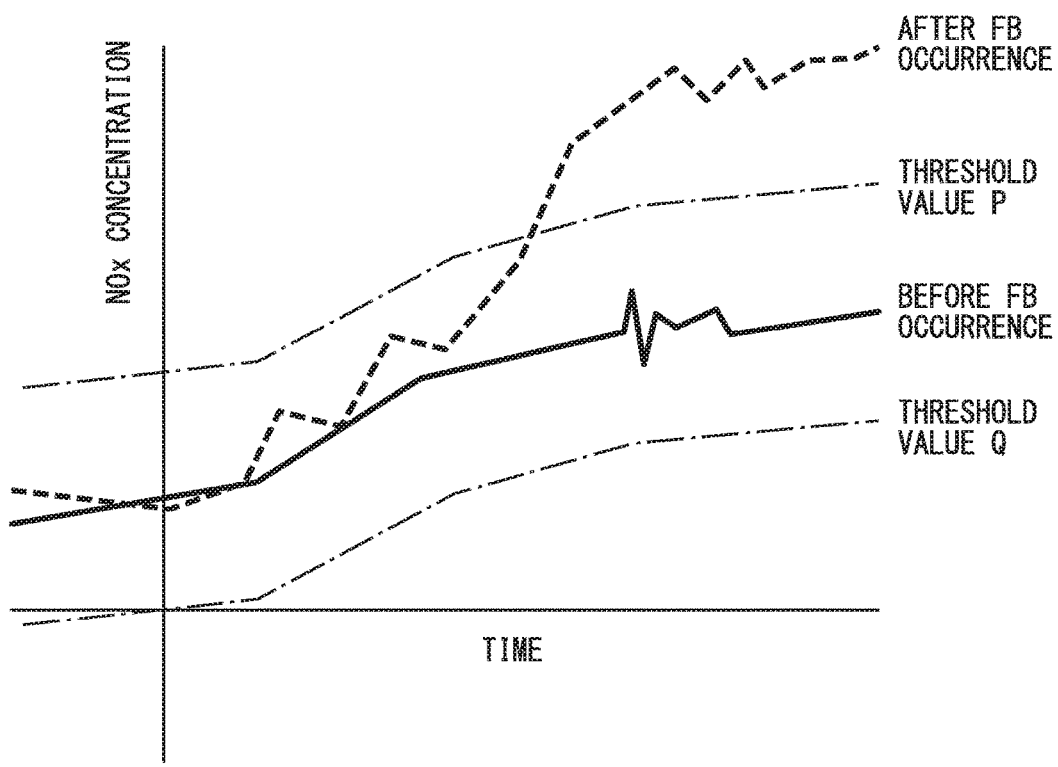
FIG. 11 is a diagram illustrating a function of a malfunction determination unit according to the third embodiment.

FIG. 11 is a diagram illustrating a function of a malfunction determination unit according to the third embodiment.

The malfunction determination unit 104 according to this embodiment acquires a change in a state quantity (NOx concentration) as indicated by a solid line or a broken line of FIG. 11 before/after the flashback occurrence and compares changes. Specifically, the malfunction determination unit 104 first stores the change in the NOx concentration acquired via the state quantity sensor 23 during normal operation of the combustion system 1 (the solid line of FIG. 11). After the flashback occurs in any main fuel nozzle group 3 and a restoration process (steps S11 to S13 (FIG. 6)) by the combustion control device 10 is performed, the malfunction determination unit 104 re-acquires the change (broken line of FIG. 11) in the NOx concentration at the time of restoration to the normal operation by the combustion control device 10 and compares the change after the flashback occurrence with a change (solid line of FIG. 11) before the flashback occurrence.

For example, in the case of FIG. 11, the malfunction determination unit 104 detects that the change in the NOx concentration acquired before the flashback occurrence (solid line) and the change in NOx concentration acquired after the flashback occurrence (broken line) are significantly different. More specifically, the malfunction determination unit 104 sets threshold values P and Q (FIG. 11) having predetermined widths based on the change in the NOx concentration before the flashback occurrence (solid line) and detects that the change in the NOx concentration after the flashback occurrence is not in the range of the threshold values P and Q.

In this case, the malfunction determination unit 104 determines that damage or loss has occurred inside the combustor 2 due to the flashback and outputs a signal for providing a notification of the damage or loss to the load adjustment unit 101.

Figure 12:
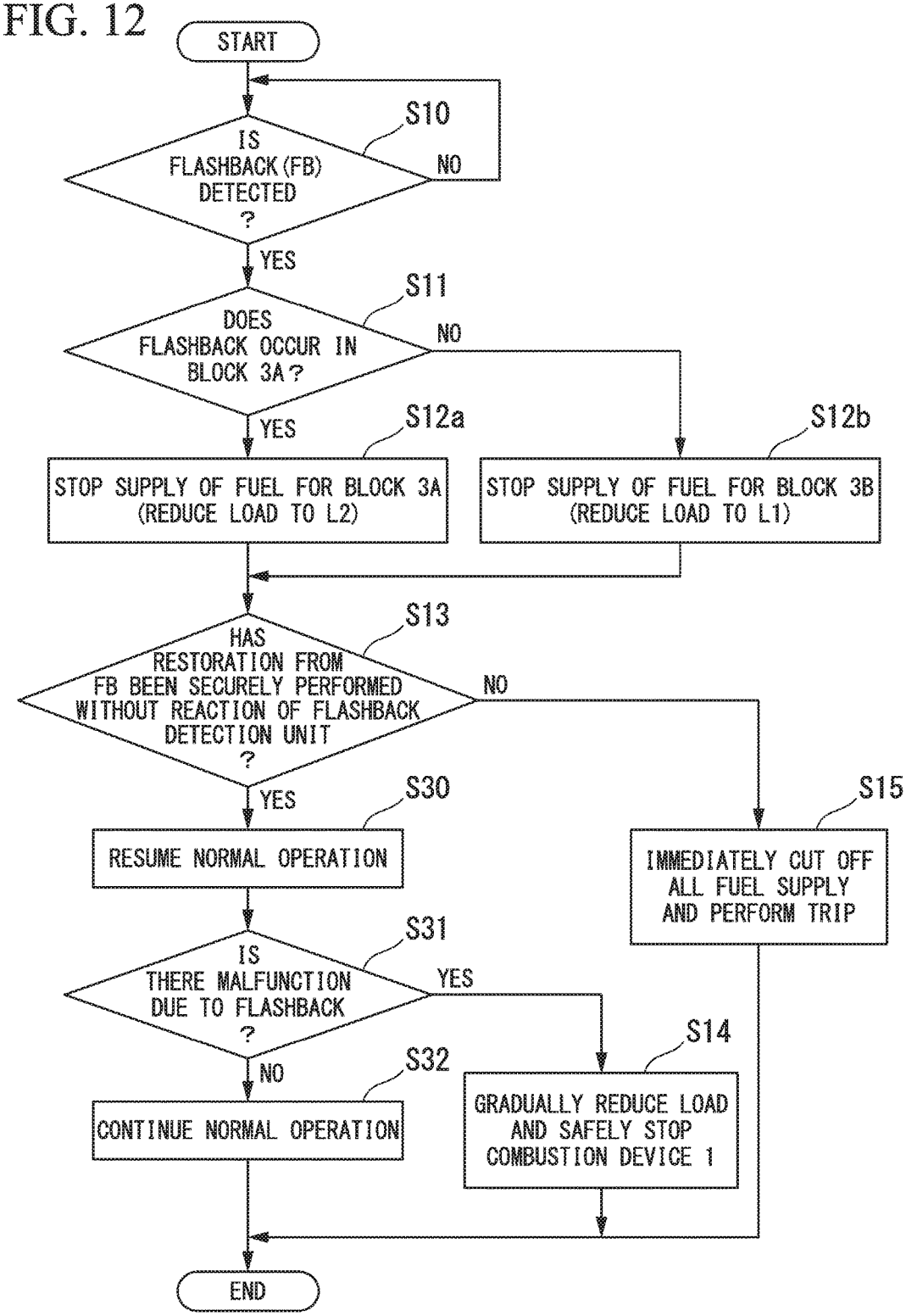
FIG. 12 is a diagram illustrating a processing flow of a combustion control device according to the third embodiment.

FIG. 12 is a diagram illustrating a processing flow of a combustion control device according to the third embodiment.

Here, the same processing steps as those of the first and second embodiments are assigned the same reference signs and description thereof will be omitted.

The processing flow illustrated in FIG. 12 starts at the time of the normal operation of the combustion system 1, that is, when combustion in the combustion room S (FIG. 2) is performed normally by supplying fuel thereto. Also, the malfunction determination unit 104 according to this embodiment acquires the change (solid line of FIG. 11) in the NOx concentration via the state quantity sensor 23 in the stage of this normal operation time.

The combustion control device 10 according to the first embodiment (second embodiment) stops the combustion system 1 while maintaining the normal operation in step S14 (FIG. 6) for safety check when the occurrence location identification unit 102 determines that the flashback has totally disappeared in step S13 (FIG. 6).

However, in the combustion control device 10 according to this embodiment, the load adjustment unit 101 re-increases the decreased turbine load L and resumes the normal operation when the occurrence location identification unit 102 determines that the flashback has totally disappeared in step S13 (step S30). At this time, the staging processing unit 100 increases the fuel supply through the A- or B-line according to the re-increased turbine load L while referring to the staging pattern SP (FIG. 4).

The malfunction determination unit 104 according to this embodiment re-acquires the change (broken line of FIG. 11) in the NOx concentration via the state quantity sensor 23 in a normal operation resumption process in step S30. The malfunction determination unit 104 compares the change in the NOx concentration acquired during initial normal operation (solid line of FIG. 11) with the change in the NOx concentration acquired during the normal operation resumption after the restoration from the flashback state (broken line of FIG. 11), and determines whether or not there is a malfunction or damage of the combustor 2 due to the flashback occurrence (step S31). Specifically, as described above, the malfunction determination unit 104 sets threshold values P and Q (FIG. 11) having predetermined widths based on the change (solid line) in the NOx concentration before the flashback occurrence and determines the presence or absence of a malfunction or damage based on whether the change in the NOx concentration after the flashback occurrence is in the range of the threshold values P and Q.

When the malfunction determination unit 104 determines that there is a malfunction or damage of the combustor 2 due to the flashback occurrence as a result of comparing changes in the NOx concentrations (step S31: YES), the load adjustment unit 101 and the staging processing unit 100 reduce an amount of fuel supply by gradually decreasing the turbine load L and safely stop the combustion system 1 (step S14).

On the other hand, when there is no difference between the changes in the NOx concentrations before and after the flashback occurrence and the malfunction determination unit 104 determines that there is no malfunction or damage of the combustor 2 due to the flashback occurrence (step S31: NO), the load adjustment unit 101 and the staging processing unit 100 continue the normal operation of step S30 as before (step S32). As described above, the load adjustment unit 101 re-increases an amount of load to resume the normal operation of its own device, so that it is possible to restore the combustion system 1 to an operation stage before the flashback occurrence.

The combustion system 1 according to the first or second embodiment always safely stops a combustion process for the safety check after restoration from the flashback state (step S14 of FIG. 6). However, the combustion system 1 according to this embodiment resumes the normal operation after the restoration from the flashback state. The combustion system 1 according to this embodiment proceeds to an operation stop process by determining that the combustor 2 is damaged if the change in the state quantity (NOx concentration) is abnormal in the process of resuming the normal operation. Thereby, the combustion system 1 according to this embodiment can immediately resume the normal operation when no malfunction or damage of the combustor 2 is found after the flashback restoration process.

<Fourth Embodiment>

Next, an example of a combustion system according to the fourth embodiment will be described with reference to the drawings.

Figure 13:
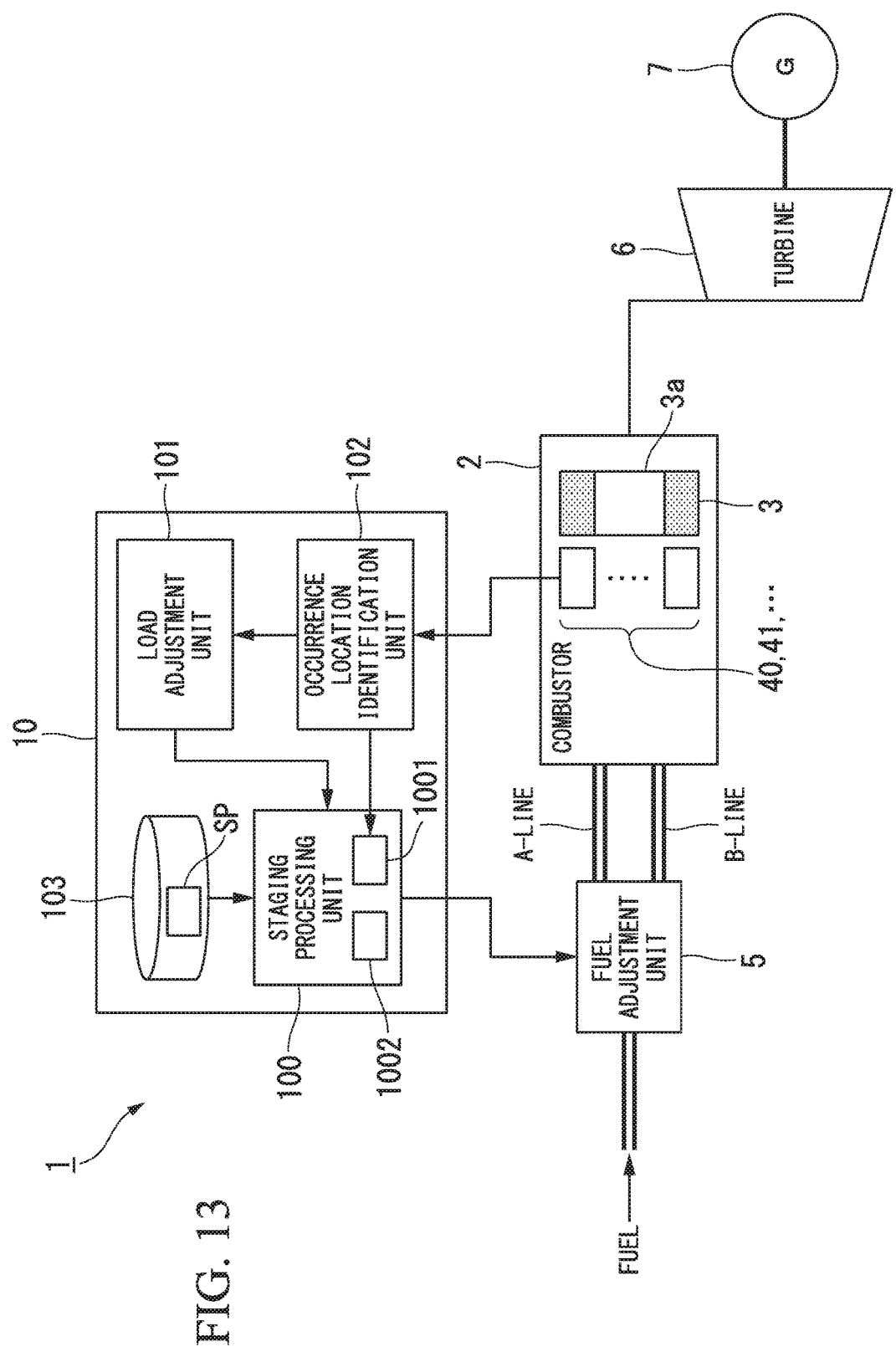
FIG. 13 is a schematic diagram illustrating a functional configuration of a combustion system according to a fourth embodiment.

FIG. 13 is a schematic diagram illustrating a functional configuration of the combustion system according to the fourth embodiment.

As illustrated in FIG. 13, the combustion system 1 according to the fourth embodiment includes a combustion control device 10, a combustor 2, and a fuel adjustment unit 5 as in the first to third embodiments. Also, the same functional elements as those of the first to third embodiments are assigned the same reference signs and description thereof will be omitted.

As illustrated in FIG. 13, the combustion system 1 according to this embodiment has a staging processing unit 100 further including a staging switching unit 1002 in the combustion system 1 according to the second embodiment.

When restoration from the flashback state is achieved and the normal operation is immediately resumed, the staging switching unit 1002 determines whether the operation state is off an operating line specified by a prepared staging pattern SP. When it is determined that the operation state is off the operating line specified by the staging pattern SP at a point in time at which the restoration from the flashback state is achieved, the staging switching unit 1002 performs a process in which the operation state is on the operating line specified by the staging pattern SP by performing switching between a staging block for which current fuel supply is stopped and a staging block for which fuel supply is performed to continue a combustion process.

Figure 14:
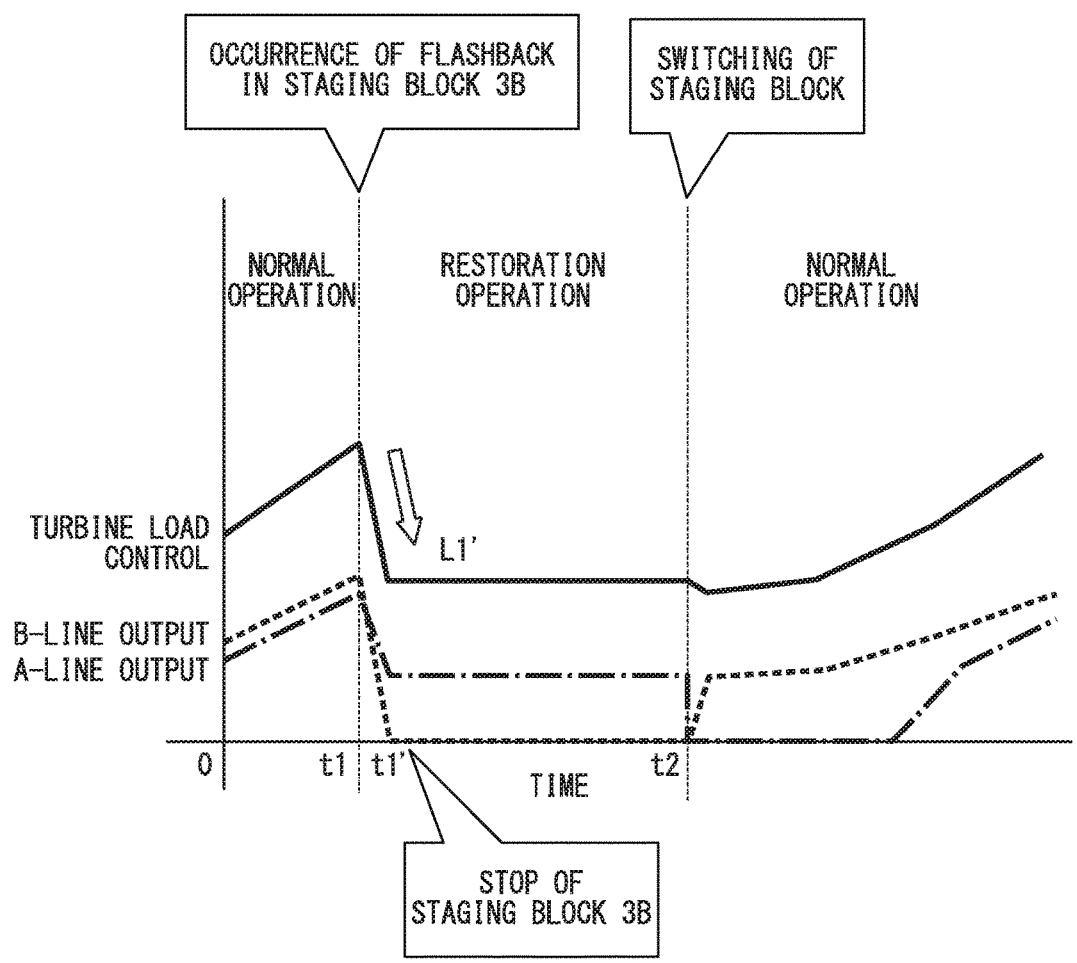
FIG. 14 is a diagram illustrating a function of a combustion control device according to the fourth embodiment.

FIG. 14 is a diagram illustrating a function of a combustion control device according to the fourth embodiment.

FIG. 14 illustrates a restoration process of the combustion control device 10 when a flashback occurs in any one of the main fuel nozzles 34, 35, 36, and 37 (see FIG. 8) constituting the staging block 3B at time t1 when the combustion system 1 operates normally according to the staging pattern SP1.

At this time, the load adjustment unit 101 immediately reduces the turbine load L to L1' and the staging processing unit 100 performs combustion corresponding to the turbine load L1' by selecting the staging block 3A in which no flashback occurs. Because the turbine load L1' is a compatible amount of load in only a single staging block, the fuel supply for the staging block 3B is stopped by the staging processing unit 100 and the flashback occurring in the staging block 3B disappears at time t1'.

Next, when the occurrence location identification unit 102 determines that the flashback has totally disappeared at time t2, the load adjustment unit 101 re-increases the load to resume normal operation. At this time, the staging switching unit 1002 of the staging processing unit 100 determines whether the operation state is off an operating line specified by the staging pattern SP and performing switching between a staging block 3B for which current fuel supply is stopped and a staging block 3A for which fuel supply is performed to continue a combustion process when the operation state is off the operating line.

For example, the operation state is off the normal operating line at times t1' to t2 in the case corresponding to combustion of only the staging block 3B with respect to the turbine load L1' in the normal operating line specified by the staging pattern SP. Therefore, the staging switching unit 1002 switches between fuel supply destinations of the staging block 3A for which the fuel supply is performed and the staging block 3B for which the fuel supply is stopped due to the flashback occurrence. Thereby, the staging processing unit 100 starts the fuel supply for the staging block 3B in correspondence with the turbine load L1', stopping the fuel supply for the staging block 3A, and performing restoration to the normal operating line specified by the staging pattern SP.

Figure 15:
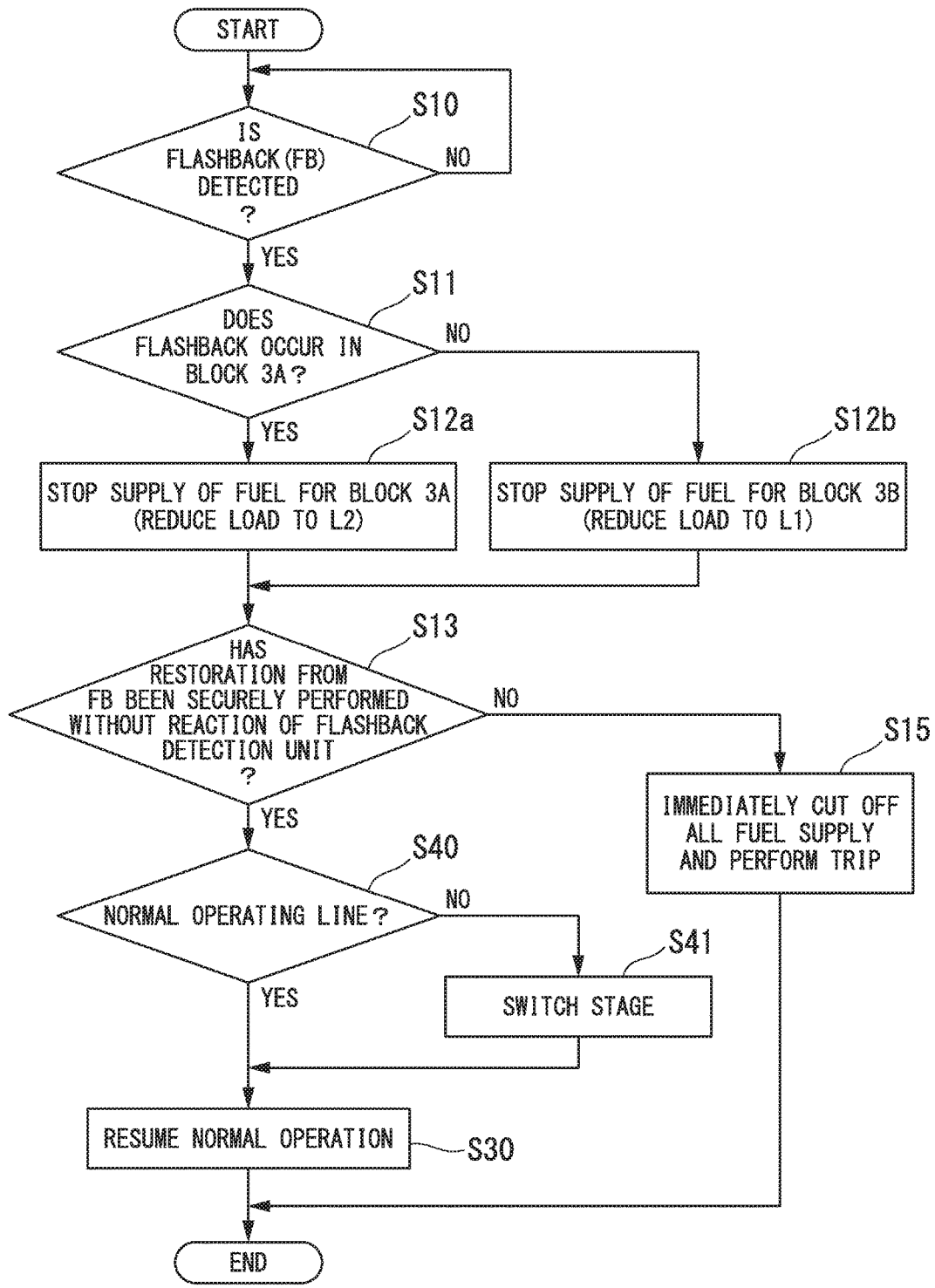
FIG. 15 is a diagram illustrating a processing flow of the combustion control device according to the fourth embodiment.

FIG. 15 is a diagram illustrating a processing flow of the combustion control device according to the fourth embodiment.

Here, the same processing steps as those of the first to third embodiments are assigned the same reference signs and description thereof will be omitted.

The processing flow of the combustion control device 10 according to this embodiment resumes the normal operation of the combustion system 1 (step S30) after restoration from the flashback state (step S13: YES) as in the third embodiment. In this embodiment, before the normal operation of the combustion system 1 is resumed, the staging switching unit 1020 determines whether the operation state after flashback restoration (times t1' to t2 of FIG. 14) is off the operating line specified by the staging pattern SP (step S40). Specifically, the staging switching unit 1002 determines whether a staging block which actually maintains combustion at a point in time after the flashback restoration matches a staging block to perform combustion in correspondence with the turbine load L1' in the normal operating line specified by the staging pattern SP.

When it is determined that the operation state is off the normal operating line specified by the staging pattern SP (step S40: NO), the staging switching unit 1002 switches the staging block to perform combustion (step S41).

For example, when a staging block during combustion in a restoration operation (after time t1' (FIG. 1)) from flashback occurrence is a "staging block 3A" and a staging block to perform combustion in correspondence with the turbine load L1' for the normal operating line specified by the staging pattern SP is a "staging block 3B," the staging switching unit 1002 determines that the operation state is off the operating line specified by the staging pattern SP (step S40: NO). The staging switching unit 1002 switches a fuel supply destination from the staging block 3A to the staging block 3B with this determination (time t2 of FIG. 14). Also, at this time, the staging processing unit 100 prevents an amount of fuel supply itself from changing and prevents the turbine load L1' from changing.

On the other hand, when it is determined that the operation state after restoration from the flashback matches the normal operating line specified by the staging pattern SP (step S40: YES), the staging switching unit 1002 resumes the normal operation according to the normal operating line specified by the staging pattern SP as it is (step S30).

According to the above process, the combustion system 1 forcibly performs restoration to the normal operating line by switching the staging block to perform combustion when the operation state is off the normal operating line according to the flashback restoration process. Thereby, in the subsequent operation, the combustion system 1 can resume the normal operation according to the normal operating line (staging pattern SP).

Thereby, the combustion system 1 can resume the normal operation even after the flashback occurrence in only one type of staging pattern SP in which the normal operating line is specified and reduce the cost of the device.

<Fifth Embodiment>

Next, an example of a combustion system according to the fifth embodiment will be described with reference to the drawings.

Figure 16:
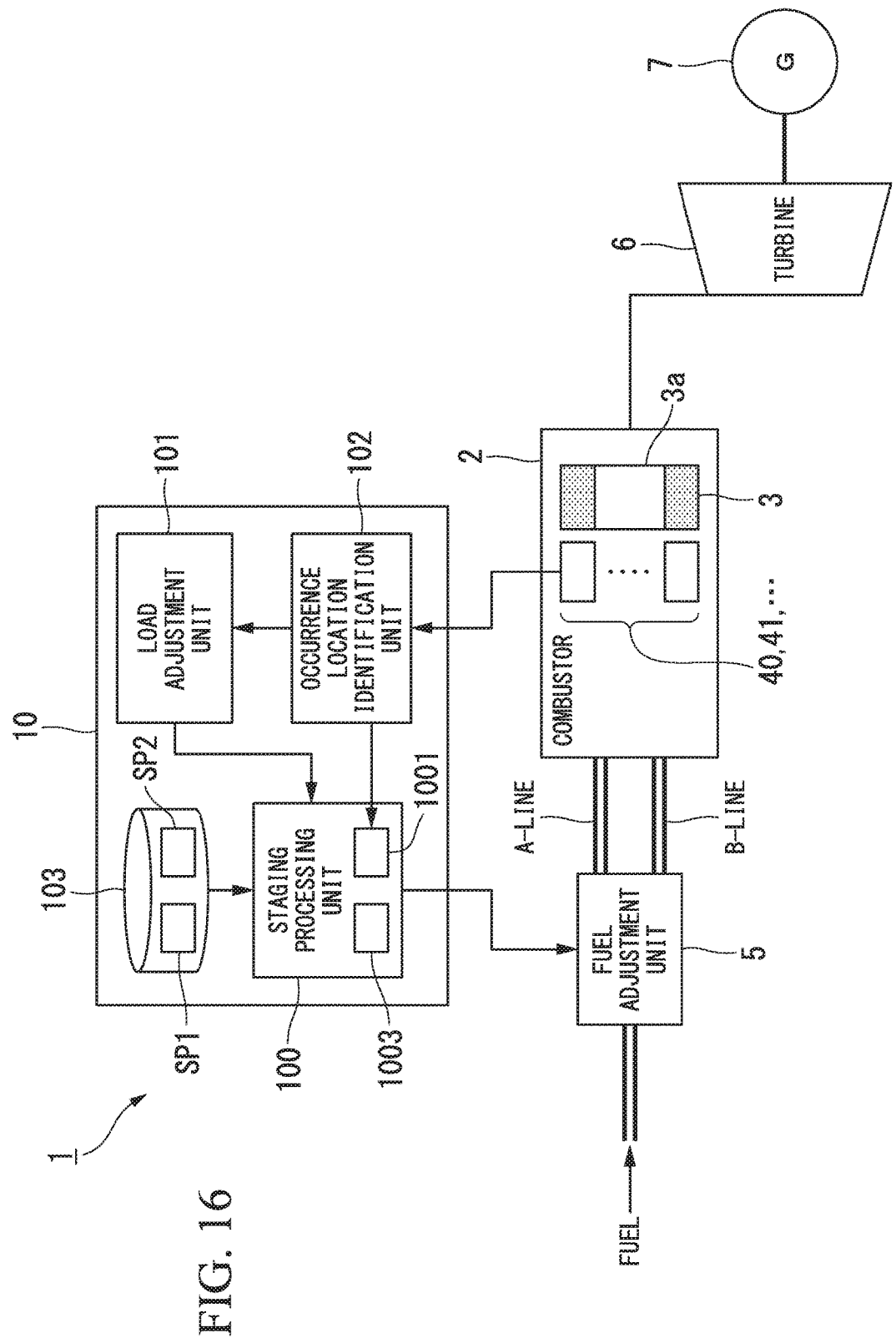
FIG. 16 is a schematic diagram illustrating a functional configuration of a combustion system according to a fifth embodiment.

FIG. 16 is a schematic diagram illustrating a functional configuration of the combustion system according to the fifth embodiment.

As illustrated in FIG. 16, the combustion system 1 according to the fifth embodiment includes a combustion control device 10, a combustor 2, and a fuel adjustment unit 5 as in the first to fourth embodiments. Also, the same functional elements as those of the first to fourth embodiments are assigned the same reference signs and description thereof will be omitted.

As illustrated in FIG. 16, the combustion system 1 according to this embodiment has a staging processing unit 100 further including a pattern selection unit 1003 in the combustion system 1 according to the second embodiment. Also, the storage unit 103 stores two patterns of a staging program SP1 and a staging program SP2.

The pattern selection unit 1003 selects the operating line to be applied when the normal operation of the combustion system 1 is resumed from the staging programs SP1 and SP2 according to the operation state after restoration from the flashback state.

FIGS. 17A and 17B are first and second diagrams illustrating an example of a staging pattern according to the fifth embodiment.

The storage unit 103 according to this embodiment stores two types of staging patterns SP1 and SP2.

The staging processing unit 100 according to this embodiment performs fuel supply according to the turbine load L based on the staging pattern SP1, for example, during the normal operation. Specifically, when the load adjustment unit 101 increases the turbine load L when the operation starts, the staging processing unit 100 initially supplies a fuel to only the A-line based on the staging pattern SP1 and performs a combustion process in the staging block 3A. When the turbine load L is increased by a certain level or more, the fuel supply for the B-line also starts and fuels of an amount of supply Pa2' to the A-line and an amount of supply Pb2' to the B-line (Pa2', Pb2'>0) are supplied in the stage of a turbine load L2'

On the other hand, the staging pattern SP2 specifies an operating line different from the staging pattern SP1. If the load adjustment unit 101 increases the turbine load L according to the staging program SP2 illustrated in FIGS. 17A and 17B, the staging processing unit 100 initially supplies a fuel to only the B-line and performs a combustion process in the staging block 3B. When the turbine load L is increased by a certain level or more, the fuel supply for the A-line also starts and fuels of an amount of supply Pa2' to the A-line and an amount of supply Pb2' to the B-line are supplied in the stage of the turbine load L2'. That is, the staging patterns SP1 and SP2 in which the staging blocks 3A and 3B to perform combustion are mutually switched according to the turbine load L are specified.

Also, when the staging processing unit 100 performs an operation according to the staging pattern SP2, the pattern selection unit 1003 may switch the staging pattern in operation from SP2 to SP1 at a point in time at which the operation state matches (intersects) the operating line based on the staging pattern SP1 (for example, a point in time at which the turbine load L reaches L2'). In this case, in the staging pattern SP2, it is only necessary for at least the operating line in which the turbine load L is between 0 and L2' to be specified.

Figure 18:
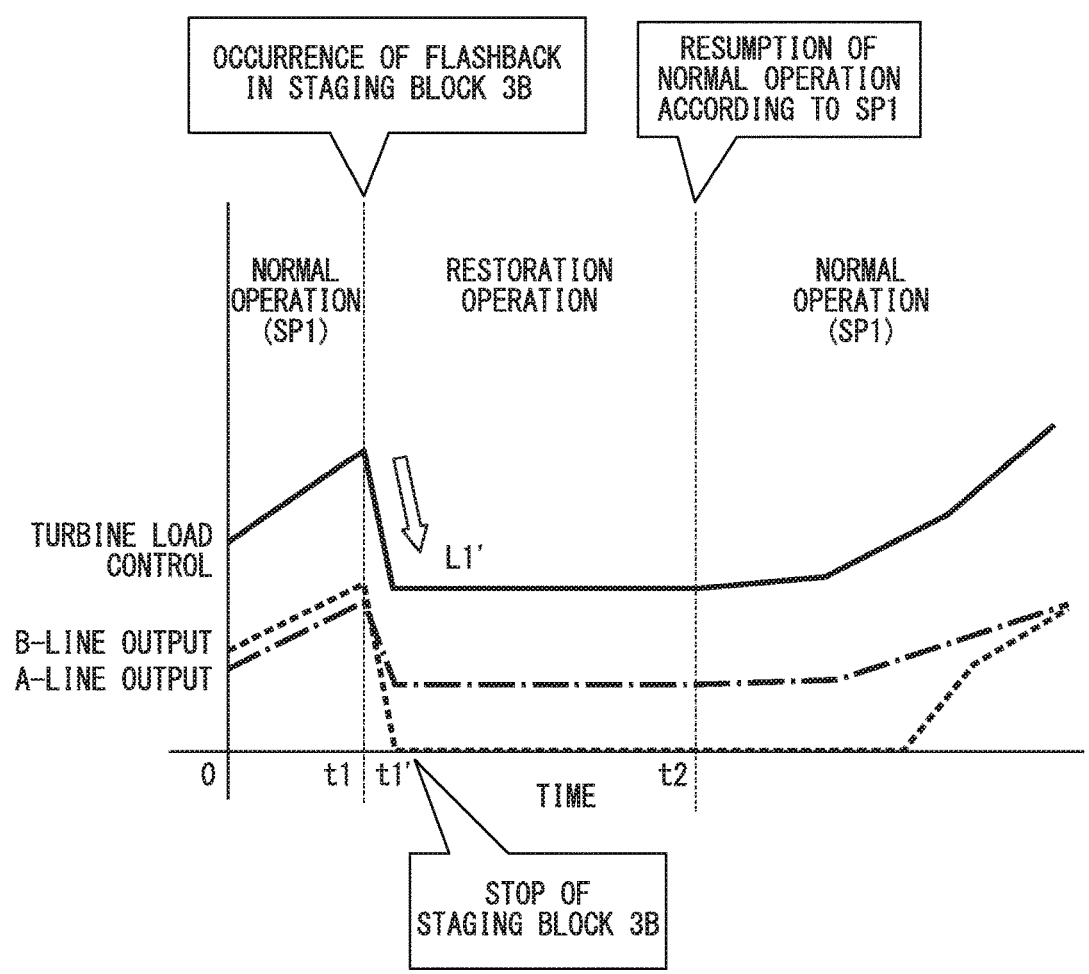
FIG. 18 is a first diagram illustrating a function of a combustion control device according to the fifth embodiment.
Figure 19:
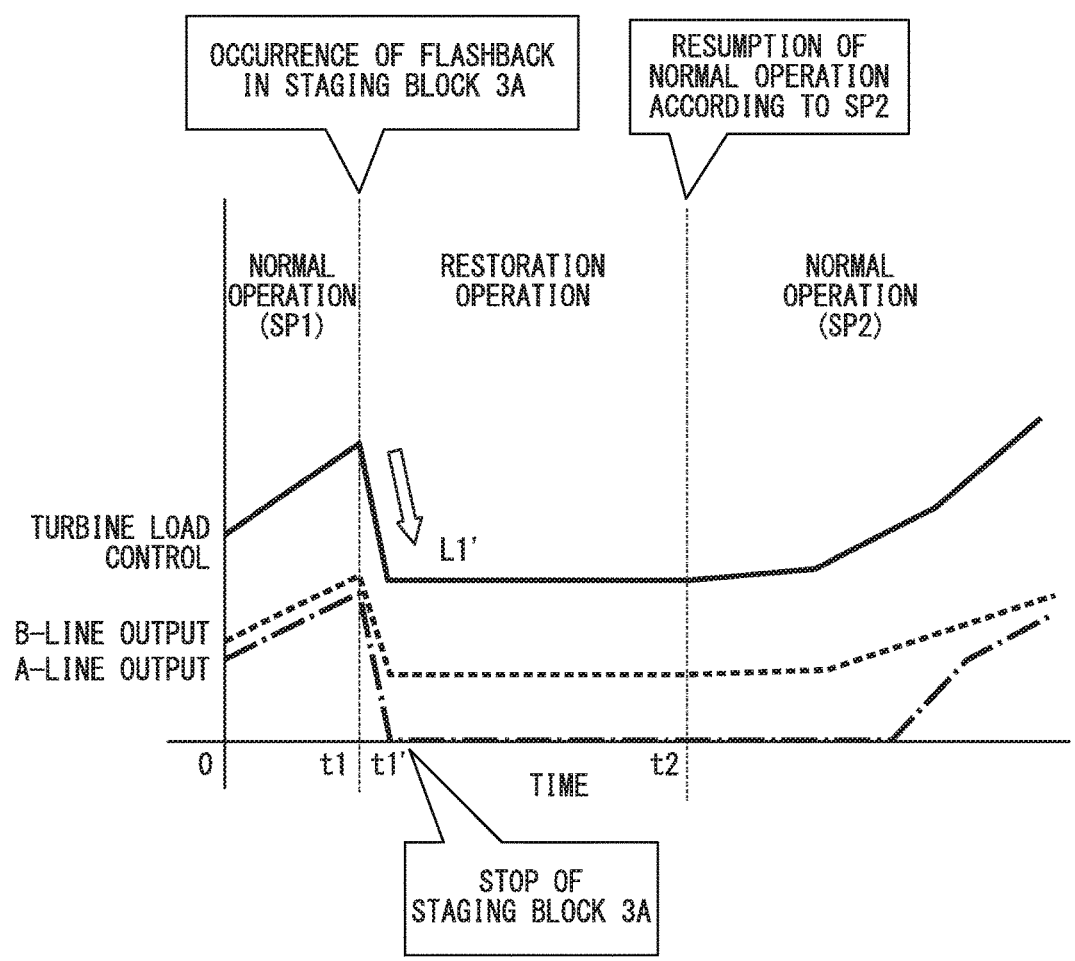
FIG. 19 is a second diagram illustrating a function of the combustion control device according to the fifth embodiment.

FIGS. 18 and 19 are first and second diagrams illustrating a function of a combustion control device according to the fifth embodiment.

FIG. 18 illustrates a restoration process of the combustion control device 10 when a flashback occurs in any one of the main fuel nozzles 34, 35, 36, and 37 (see FIG. 8) constituting the staging block 3B at time t1 when the combustion system 1 performs normal operation according to the staging program SP1.

At this time, the load adjustment unit 101 immediately reduces the turbine load L to L1' and the staging processing unit 100 performs combustion corresponding to the turbine load L1' by selecting the staging block 3A in which no flashback occurs. Because the turbine load L1' is a compatible amount of load in only a single staging block, the fuel supply for the staging block 3B is stopped by the staging processing unit 100 (see FIG. 18) and the flashback occurring in the staging block 3B disappears at time t1'.

Next, when the occurrence location identification unit 102 determines that the flashback has totally disappeared at time t2, the load adjustment unit 101 re-increases the load to resume normal operation. At this time, the pattern selection unit 1003 of the staging processing unit 100 selects the staging pattern to be used when the normal operation is resumed according to an operation state at the time of flashback restoration.

For example, according to FIG. 18, only the staging block 3A performs a combustion process in correspondence with the turbine load L1' at times t1' to t2. In this case, the pattern selection unit 1003 determines that the operation state at time t2 after the flashback restoration is closer to the staging pattern SP1 than the staging pattern SP2 and selects to perform the normal operation after time t2 according to the staging pattern SP1 (see FIG. 18).

On the other hand, FIG. 19 illustrates a restoration process of the combustion control device 10 when a flashback occurs in any one of the main fuel nozzles 30, 31, 32, and 33 (see FIG. 8) constituting the staging block 3A at time t1 when the combustion system 1 performs normal operation according to the staging program SP1.

At this time, as in the case illustrated in FIG. 18, the load adjustment unit 101 immediately reduces the turbine load L to L1' and the staging processing unit 100 performs combustion corresponding to the turbine load L1' by selecting the staging block 3B in which no flashback occurs. Thereby, the fuel supply for the staging block 3A is stopped (see FIG. 19) and the flashback occurring in the staging block 3A disappears.

Next, when the occurrence location identification unit 102 determines that the flashback has totally disappeared at time t2, the load adjustment unit 101 re-increases the load to resume normal operation.

For example, according to FIG. 19, only the staging block 3B performs a combustion process in correspondence with the turbine load L1' at times t1' to t2. In this case, the pattern selection unit 1003 determines that the operation state at time t2 after the flashback restoration is closer to the staging pattern SP2 than the staging pattern SP1 and selects execution of the normal operation after time t2 according to the staging pattern SP2 (see FIG. 19).

Figure 20:
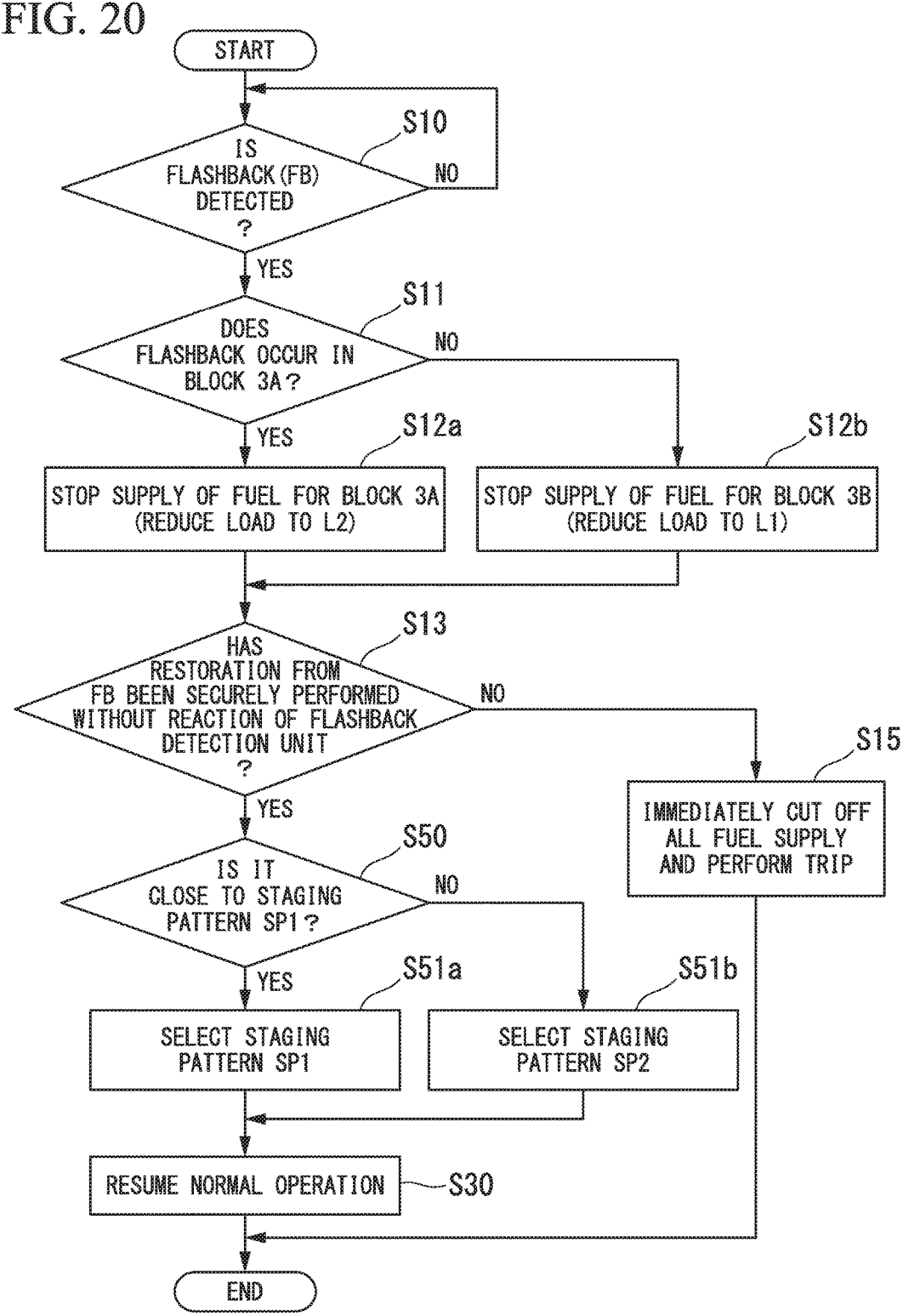
FIG. 20 is a diagram illustrating a processing flow of the combustion control device according to the fifth embodiment.

FIG. 20 is a diagram illustrating a processing flow of the combustion control device according to the fifth embodiment.

Here, the same processing steps as those of the first to fourth embodiments are assigned the same reference signs and description thereof will be omitted.

The processing flow of the combustion control device 10 according to this embodiment resumes the normal operation of the combustion system 1 after the restoration from the flashback state (step S13: YES) as in the third embodiment (step S30). In this embodiment, before the normal operation of the combustion system 1 is resumed, the pattern selection unit 1003 determines either of the staging patterns SP1 and SP2 to which the operation state after flashback restoration (times t1' to t2 of FIG. 14) is closer (step S50). When the operation state at time t2 is closer to the staging pattern SP1 (step S50: YES), the pattern selection unit 1003 selects the staging pattern SP1 (step S51a). In addition, when the operation state at time t2 is closer to the staging pattern SP2 (step S50: NO), the pattern selection unit 1003 selects the staging pattern SP2 (step S51b).

As an example of a process in steps S50, S51a, and S51b, at a point in time after the flashback restoration (time t2), the pattern selection unit 1003 may select the staging pattern SP1 when a staging block which actually maintains combustion in correspondence with the turbine load L1' is a staging block 3A and select the staging pattern SP2 when the staging block is a staging block 3B.

When the pattern selection unit 1003 selects either of the staging patterns SP1 and SP2, the staging processing unit 100 performs fuel supply according to the selected staging pattern. Thereby, the normal operation of the combustion system 1 starts (step S30). Also, when an operation is performed according to the staging pattern SP2 in step S30, the pattern selection unit 1003 may proceed to the staging pattern SP1 in a stage matching (intersecting) the staging pattern SP1 as described above.

Through the above process, when restoration to the normal operating line is performed after the flashback restoration process, the combustion system 1 performs course correction while selecting a closest operating line from the operation state at that time. Thereby, regardless of which staging block the flashback occurs in, abrupt switching of the fuel supply destination does not occur when the normal operation is resumed from the flashback occurrence. That is, although the combustion system 1 according to the fifth embodiment needs a plurality of staging patterns to be prepared in advance as compared with the combustion system 1 according to the fourth embodiment, the selection of the staging pattern in accordance with the flashback restoration process is possible for that and it is possible to implement operation resumption in which a load change amount is smaller.

The processing flows of the combustion control devices 10 according to the above-described fourth and fifth embodiments are not limited to those illustrated in FIGS. 15 and 20. For example, when the normal operation resumption process (step S30 of FIGS. 15 and 20) is performed, the malfunction presence/absence determination process (step S31 of FIG. 12) of the combustor according to the flashback may be further performed as in the combustion control device 10 according to the third embodiment. In this case, the combustion control devices 10 according to the fourth and fifth embodiments are assumed to include a malfunction determination unit 104.

Also, an aspect in which all the combustion systems 1 according to the above-described embodiments have two staging blocks 3A and 3B and perform a combustion process for both staging blocks 3A and 3B has been described. However, the combustion systems 1 according to the embodiments are not limited to this aspect.

For example, an aspect having three or more staging blocks may be provided. In this case, the staging patterns SP (SP1 and SP2) are assumed to specify an amount of fuel supply for each of the three or more staging blocks according to the turbine load L.

Also, the above-described combustion control device 10 may be an aspect internally having a computer system. A process of the processing in the above-described combustion control device 10 may be stored in a computer-readable recording medium in the form of a program. The above-described process may be performed when a computer reads and executes the program. Here, the computer-readable recording medium may be a magnetic disk, a magneto-optical disc, a compact disc read-only memory (CD-ROM), a digital versatile disc-read only memory (DVD-ROM), a semiconductor memory, or the like. In addition, the computer program may be distributed to the computer through a communication line, and the computer receiving the distributed program may execute the program.

Also, the combustion control device 10 may be a combustion control device in which the above-described functional units are further distributed in a plurality of devices connected via a network.

While some embodiments of the present invention have been described above, these embodiments are examples of the invention and are not intended to limit the scope of the invention. These embodiments may be performed in various other forms and various omissions, substitutions, and changes can be made without departing from the subject matter of the present invention. These embodiments and modifications are also considered to be included in the invention disclosed in the appended claims and its equivalent scope like those included in the scope or subject of the invention.

INDUSTRIAL APPLICABILITY

According to the combustion control device, the combustion system, the combustion control method, and the program described above, it is possible to reduce a burden on a device in restoration and stop processes when a flashback occurs.

REFERENCE SIGNS LIST

1 Combustion system
10 Combustion control device

100 Staging processing unit
101 Load adjustment unit
102 Occurrence location identification unit
103 Storage unit
104 Malfunction determination unit
1001 Block selection unit
1002 Staging switching unit
1003 Pattern selection unit
2 Combustor
21 Main fuel supply port
22 Pilot fuel supply port
23 State quantity sensor
3 Main fuel nozzle group
3a Pilot fuel nozzle
30 to 37 Main fuel nozzle
40 to 44 Flashback detection unit
5 Fuel adjustment unit
6 Turbine
7 Electric generator

The invention claimed is:

1. A combustion control device which is used in a combustion system and stops a supply of a fuel for staging blocks including a main fuel nozzle in which a flashback occurs based on a detection signal, wherein for each of the staging blocks, a respective plurality of optical detectors configured to detect the flashback is included, and the detection signal is input from at least one of the optical detectors, the combustion control device comprising:
    a processor; and
    a non-transitory memory having stored thereon executable instructions, which when executed by the processor, cause the combustion control device to function as a staging processing unit configured to instruct to supply the fuel or stop the supply of the fuel for each of the staging blocks based on a staging pattern in which a correspondence relation between an amount of load of the combustion system and an amount of the supply of the fuel for each of the staging blocks is specified so that one of the staging blocks to which the fuel is supplied is switched in response to the amount of load;
    wherein the executable instructions, when executed by the processor, cause the combustion control device to further function as a load adjustment unit configured to reduce the amount of load to a level at which the supply of the fuel for one of the staging blocks corresponding to the at least one of the optical detectors is stopped when the detection signal is input from the at least one of the optical detectors, wherein the level is set to a different value for each of the staging blocks for which the supply of the fuel is stopped.

2. The combustion control device according to claim 1, wherein the load adjustment unit stops the combustion system by further reducing the amount of load when the flashback disappears after initially reducing the amount of load.

3. The combustion control device according to claim 1, wherein the load adjustment unit resumes normal operation of the combustion system by re-increasing the amount of load when the flashback disappears after reducing the amount of load.

4. The combustion control device according to claim 3, wherein:
    the executable instructions, when executed by the processor, cause the combustion control device to further function as a malfunction determination unit configured to determine whether the combustion system malfunctions due to the flashback from a state quantity of the combustion system after the flashback occurs, and
    the load adjustment unit resumes normal operation of the combustion system by re-increasing the amount of load when the load adjustment unit determines that the flashback disappears and that the combustion system does not malfunction after reducing the amount of load.

5. The combustion control device according to claim 4, wherein the malfunction determination unit determines whether or not the combustion system malfunctions due to the flashback based on a change in the state quantity acquired before the flashback occurs and a change in the state quantity acquired after the flashback occurs.

6. The combustion control device according to claim 3, wherein the staging processing unit switches between fuel supply destinations of one of the staging blocks for which the supply of the fuel is stopped and one of the staging blocks which continues a combustion process in which the fuel is supplied when an operation state at a point in time at which the flashback disappears according to a process in which the load adjustment unit reduces the amount of load is off an operating line specified by the staging pattern.

7. The combustion control device according to claim 3, wherein the staging processing unit selects one of a plurality of different staging patterns according to an operation state at a point in time at which the flashback disappears according to a process in which the load adjustment unit reduces the amount of load and instructs to supply the fuel or stop the supply of the fuel for each of the staging blocks based on the one of the plurality of different staging patterns.

8. A combustion system comprising:
    the combustion control device according to claim 1; and
    a combustor including:
        a pilot fuel nozzle configured to extend along an axis and to which a pilot fuel is supplied; and
        a plurality of staging blocks including one or more sets of main fuel nozzles extending in parallel to the axis, positioned around the pilot fuel nozzle, and to which a main fuel is supplied.

9. The combustion control device according to claim 1, wherein each of the optical detectors includes an optical fiber and an optical sensor.

10. A combustion control method which is used in a combustion system and in which a supply of a fuel for staging blocks including a main fuel nozzle in which a flashback occurs is stopped based on a detection signal, wherein for each of the staging blocks, a respective plurality of optical detectors configured to detect the flashback is included, and the detection signal is input from at least one of the optical detectors, the combustion control method comprising:
    instructing to supply the fuel or stop the supply of the fuel for each of the staging blocks based on a staging pattern in which a correspondence relation between an amount of load of the combustion system and an amount of the supply of the fuel for each of the staging blocks is specified so that one of the staging blocks is switched in response to the amount of load; and
    reducing the amount of load to a level at which the supply of the fuel for one of the staging blocks corresponding to the at least one of the optical detectors is stopped when the detection signal is input from the at least one of the optical detectors, the level being set to a different value for each of the staging blocks for which the supply of the fuel is stopped.

11. The combustion control method according to claim 10, wherein each of the optical detectors includes an optical fiber and an optical sensor.

\* \* \* \* \*